(12) United States Patent
Tsunoda et al.

(10) Patent No.: US 7,674,978 B2
(45) Date of Patent: Mar. 9, 2010

(54) WIRE HARNESS, LIGHTING DEVICE, BACKLIGHT DEVICE, AND LIQUID CRYSTAL DISPLAY DEVICE

(75) Inventors: Seiichi Tsunoda, Kanagawa (JP); Hiroshi Atsumi, Saitama (JP)

(73) Assignee: Sony Corporation (JP)

( * ) Notice: Subject to any disclaimer, the term of this patent is extended or adjusted under 35 U.S.C. 154(b) by 532 days.

(21) Appl. No.: 11/497,657

(22) Filed: Aug. 2, 2006

(65) Prior Publication Data
US 2007/0081113 A1      Apr. 12, 2007

(30) Foreign Application Priority Data

Aug. 10, 2005   (JP)  ............................ P2005-231556
Jun. 16, 2006    (JP)  ............................ P2006-167318

(51) Int. Cl.
*H02G 3/04*      (2006.01)

(52) U.S. Cl. ................... 174/72 A; 174/68.1; 174/68.3; 174/102 R; 16/2.1; 16/2.2

(58) Field of Classification Search ............... 174/72 A, 174/68.1, 68.3, 135, 117 F, 36, 102 R, 137 R, 174/138 R, 350, 71 R, 106 R, 152 G, 153 G; 16/2.1, 2.2

See application file for complete search history.

(56) References Cited

U.S. PATENT DOCUMENTS

| | | | | |
|---|---|---|---|---|
| 4,499,438 | A * | 2/1985 | Cornelius et al. | ............. 174/36 |
| 6,438,828 | B1 * | 8/2002 | Uchiyama | ............... 174/152 G |
| 6,528,731 | B2 * | 3/2003 | Murakami et al. | ........ 174/117 F |
| 6,649,828 | B2 * | 11/2003 | Rockney et al. | ................ 174/36 |
| 7,105,746 | B2 * | 9/2006 | Shimura | .................... 174/72 A |

FOREIGN PATENT DOCUMENTS

| | | |
|---|---|---|
| JP | 41-24674 | 12/1941 |
| JP | 49095191 | 9/1974 |
| JP | 53-9481 | 1/1978 |
| JP | 57000803 | 1/1982 |
| JP | 61-30920 U | 2/1986 |
| JP | 4301314 | 10/1992 |
| JP | 4301315 | 10/1992 |
| JP | 5305688 | 11/1993 |
| JP | 9198929 | 7/1997 |
| JP | 11111066 | 4/1999 |
| JP | 2001-255527 A | 9/2001 |
| JP | 2002-303848 A | 10/2002 |
| JP | 2002293203 | 10/2002 |
| JP | 2004227987 | 8/2004 |
| WO | 02/217333 A1 | 2/2002 |

OTHER PUBLICATIONS

Japanese Office Action issued on Apr. 15, 2008 in connection with Japanese Patent Application No. JP 2006-167318 (6 pages).

* cited by examiner

*Primary Examiner*—Angel R Estrada
(74) *Attorney, Agent, or Firm*—Lerner, David, Littenberg, Krumholz & Mentlik, LLP

(57) ABSTRACT

A wire harness includes a conductive member configured to connect electric members to each other for electric conduction; a covering member configured to enclose and cover the conductive member, the covering member being formed of a first insulating material; and a retaining member configured to enclose the covering member so as to define a space between the covering member and the retaining member, the retaining member being formed of a second insulating material.

4 Claims, 17 Drawing Sheets

WIRE HARNESS, LIGHTING DEVICE, BACKLIGHT DEVICE, AND LIQUID CRYSTAL DISPLAY DEVICE

CROSS-REFERENCE TO RELATED APPLICATIONS

The present application claims priority from Japanese Patent Application No. JP 2006-167318 filed on Jun. 16, 2006 and Japanese Patent Application No. JP 2005-231556 filed on Aug. 10, 2005, the disclosures of which are hereby incorporated by reference herein.

BACKGROUND OF THE INVENTION

1. Field of the Invention

The present invention relates to a wire harness for interconnecting electric members arranged at a distance from each other in various apparatuses such as electric devices, motor vehicles and the like, and a lighting device, a backlight device, and a liquid crystal display device that are suitable for supplying alternating-current power using the wire harness.

2. Description of the Related Art

In the past, wire harnesses have often been used in a lighting device, a backlight device, and a liquid crystal display device as electric devices and various apparatuses such as motor vehicles and the like. A wire harness is to interconnect electric devices, electric parts, or electric blocks (which will hereinafter be referred to generically as electric members) arranged in a state of being physically separated from each other, so that electric signals or power is exchanged between these electric members. That is, a wire harness includes a set of one or a plurality of wires whose length, bend shape and the like are predetermined. A wire harness shortens a time for connecting electric members to each other during manufacturing of the above-described various devices, prevents erroneous wiring, and uniformizes wiring routing to improve product quality.

In a field of electric devices, in particular, there has recently been a sign of rapid spread of liquid crystal display devices into general households. Such a non-self-luminous display device uses a backlight device formed by providing a backlight unit (lighting unit) using a cold cathode fluorescent tube as a light source and interconnecting the lighting unit and a drive and control unit for driving the lighting unit by a covered wire made of a conductive material. Also, cold cathode fluorescent tubes driven at a high frequency than the frequency of commercial power have been coming into use as a lighting device for illumination because of good efficiency of light emission of the cold cathode fluorescent tubes.

Such backlight devices having a lighting unit and a drive and control unit and lighting devices for illumination light a cold cathode fluorescent tube using alternating-current power at a few ten kHz in many cases. Techniques such for example as a technique of supplying power from one cold cathode fluorescent tube driving device to a plurality of cold cathode fluorescent tubes by a conductive material wire (see Japanese Patent Laid-Open No. 2002-303848, referred to as Patent Document 1 hereinafter) and a technique for reducing leakage current from a covered wire using an insulating material for a casing (see Japanese Patent Laid-Open No. 2001-255527, referred to as Patent Document 2 hereinafter) have been actively studied.

In a field of motor vehicles, electric vehicles using a synchronous motor are drawing attention. Also in this field, a covered wire for connecting the synchronous motor and a control unit may be required, a current flowing through the covered wire is an alternating current, and a leakage current occurs as in the backlight devices of liquid crystal display devices and lighting devices for illumination as described above.

It is desirable to use a wire harness in the backlight device of a liquid crystal display device as described above in order to improve mass productivity. Recently, on the other hand, the screen of the liquid crystal display device has become larger, the backlight device has accordingly become larger, and power for driving cold cathode fluorescent tubes has been increasing. Further, the use of a mode in which one inverter circuit (drive and control unit) sequentially drives a plurality of cold cathode fluorescent tubes or simultaneously drives the plurality of cold cathode fluorescent tubes, as disclosed in Patent Document 1, has been increasing. As a result, the wire harness becomes longer as compared with a case where one cold cathode fluorescent tube is driven by one inverter circuit. In a lighting device for illumination, a cold cathode fluorescent tube and a driving power unit are separated at a distance in order to increase design freedom. In the field of motor vehicles, a distance between a driving power unit and a synchronous motor operating on alternating-current power is increasing because of use of a so-called in-wheel motor. In either case, the wire harness for connecting the driving power unit and a load circuit to each other tends to become longer.

In such a case, a wire harness as used in the past in an electric device, a motor vehicle or the like, the wire harness being made by only forming a bundle of covered wires along a wiring path, increases an absolute amount of leakage current flowing to a conductive material casing (for example an iron or aluminum chassis), so that power from a drive and control unit does not efficiently reaches a load circuit such as a cold cathode fluorescent tube or the like. This for example invites a decrease in light emission efficiency or an increase in size of the drive and control unit in the backlight device, and further invites an increase in unnecessary device power consumption. Using an insulating material for a casing as disclosed in Patent Document 2 can reduce leakage current, but has problems to overcome in terms of the strength of the casing and measures against undesired electromagnetic radiation. Incidentally, lighting devices for illumination and electric vehicles have similar problems to solve as power is increased and as alternating-current power frequency is raised.

In view of the above problems, it is desirable to provide a wire harness that causes a small amount of leakage of alternating-current power and is suitable for supplying alternating-current power, and a lighting device, a backlight device, and a liquid crystal display device that supply alternating-current power using the wire harness.

SUMMARY OF THE INVENTION

According to an embodiment of the present invention, there is provided a wire harness including a conductive member configured to connect electric members to each other for electric conduction; a covering member configured to enclose and cover the conductive member, the covering member being formed of a first insulating material; and a retaining member configured to enclose the covering member so as to define a space between the covering member and the retaining member, the retaining member being formed of a second insulating material.

In this wire harness, the conductive member connects the electric members to each other for electric conduction. The covering member formed of the first insulating material encloses and covers the conductive member. The retaining member encloses the covering member so as to define a space between the covering member and the retaining member.

According to an embodiment of the present invention, there is provided a lighting device including a driving power supply unit configured to supply alternating-current power; a lighting unit having a cold cathode fluorescent tube supplied with the alternating-current power and a casing for retaining the cold cathode fluorescent tube; and a conductive member covered by an insulating material, the conductive member connecting the driving power supply unit and the cold cathode fluorescent tube to each other for electric conduction, and the conductive member being enclosed by a retaining member made of an insulating material, the retaining member defining a space between the conductive member and the retaining member and being disposed along the casing; wherein the retaining member suppresses leakage of the alternating-current power.

In this lighting device, the driving power supply unit and the lighting unit are connected to each other by the conductive member, so that the alternating-current power from the driving power supply unit makes the cold cathode fluorescent tube of the lighting unit emit light. The conductive member is enclosed by the retaining member made of the insulating material and defining a space between the covering member and the retaining member, whereby leakage of the alternating-current power is suppressed.

According to an embodiment of the present invention, there is provided a backlight device for emitting light from a back surface of an image display plane, the backlight device including a driving power supply unit configured to supply alternating-current power; a lighting unit having a cold cathode fluorescent tube supplied with the alternating-current power and a casing for retaining the cold cathode fluorescent tube; and a conductive member covered by an insulating material, the conductive member connecting the driving power supply unit and the cold cathode fluorescent tube to each other for electric conduction, and the conductive member being enclosed by a retaining member made of an insulating material, the retaining member defining a space between the conductive member and the retaining member and being disposed along the casing; wherein the retaining member suppresses leakage of the alternating-current power.

This backlight device emits light from the back surface of the image display plane, and functions as a backlight device. The driving power supply unit and the lighting unit are connected to each other by the conductive member, so that the alternating-current power from the driving power supply unit makes the cold cathode fluorescent tube of the lighting unit emit light. The conductive member is enclosed by the retaining member made of the insulating material and defining a space between the conductive member and the retaining member, whereby leakage of the alternating-current power is suppressed.

According to an embodiment of the present invention, there is provided a liquid crystal display device including a liquid crystal panel; a panel driving unit configured to generate a driving signal according to a video signal for driving the liquid crystal panel; a lighting unit having a cold cathode fluorescent tube for emitting light from a back surface of an image display plane of the liquid crystal panel; a driving power supply unit configured to supply alternating-current power to the lighting unit; and a wire harness including a conductive member, a covering member configured to enclose and cover the conductive member, the covering member being formed of a first insulating material, and a retaining member disposed to enclose the covering member so as to define a space between the covering member and the retaining member, the retaining member being formed of a second insulating material, wherein the driving power supply unit and the lighting unit are connected to each other by the conductive member of the wire harness.

This liquid crystal display device includes the panel driving unit, the lighting unit, and the driving power supply unit. The driving power supply unit and the lighting unit are connected to each other by a wire harness including a conductive member, a covering member configured to enclose and cover the conductive member, the covering member being formed of a first insulating material, and a retaining member configured to enclose the covering member so as to define a space between the covering member and the retaining member, the retaining member being formed of a second insulating material. Thereby, leakage of the alternating-current power is suppressed.

According to the present invention, it is possible to provide a wire harness that causes a small amount of leakage of alternating-current power, and a lighting device, a backlight device, and a liquid crystal display device that supply alternating-current power using the wire harness.

DETAILED DESCRIPTION

Figure 1A:
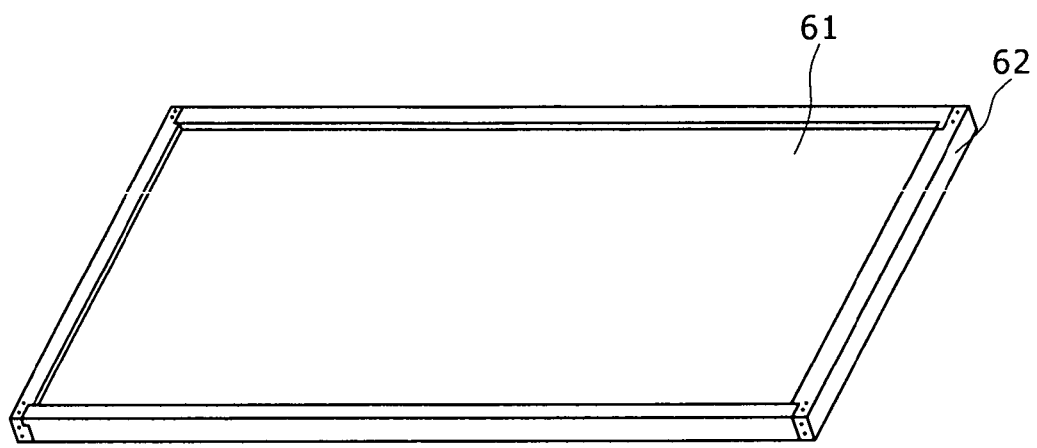
FIGS. 1A and 1B are external views of a liquid crystal display device according to an embodiment.
Figure 1B:
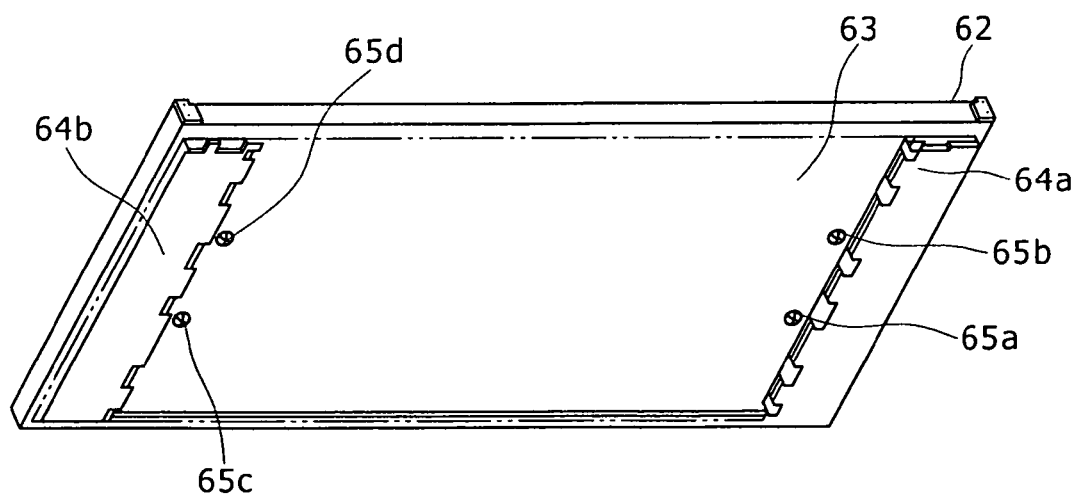
Figure 2:
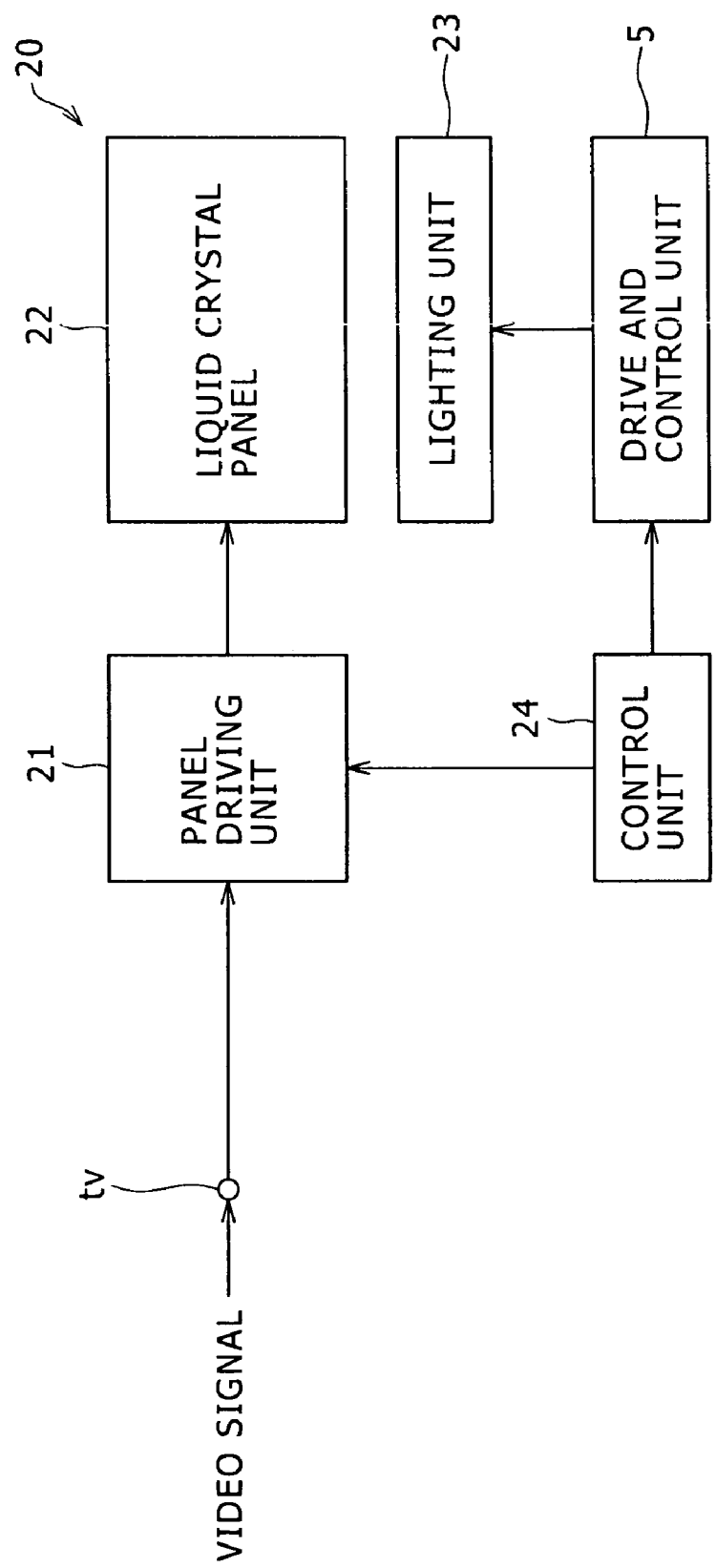
FIG. 2 is a block diagram of the liquid crystal display device according to the embodiment.
Figure 3:
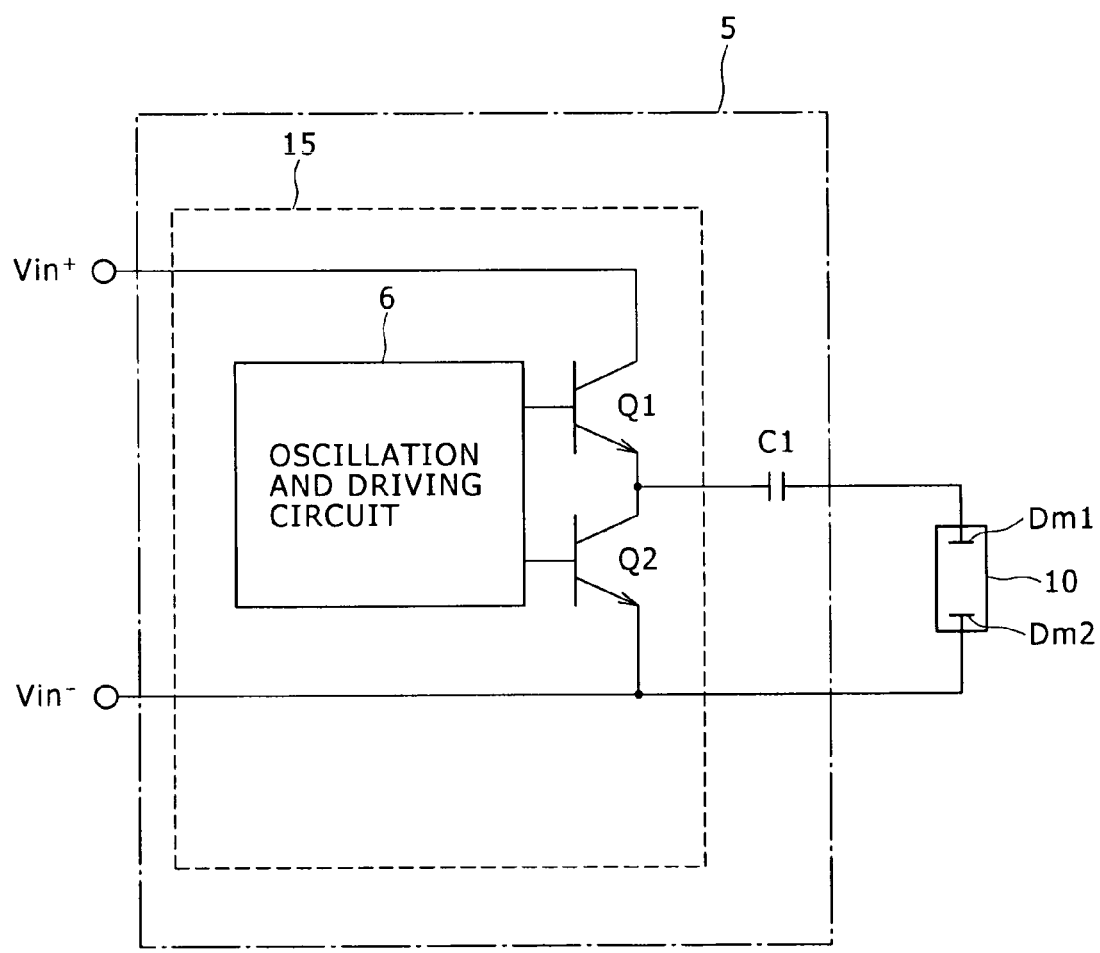
FIG. 3 shows a drive and control unit of the liquid crystal display device according to the embodiment.
Figure 4:
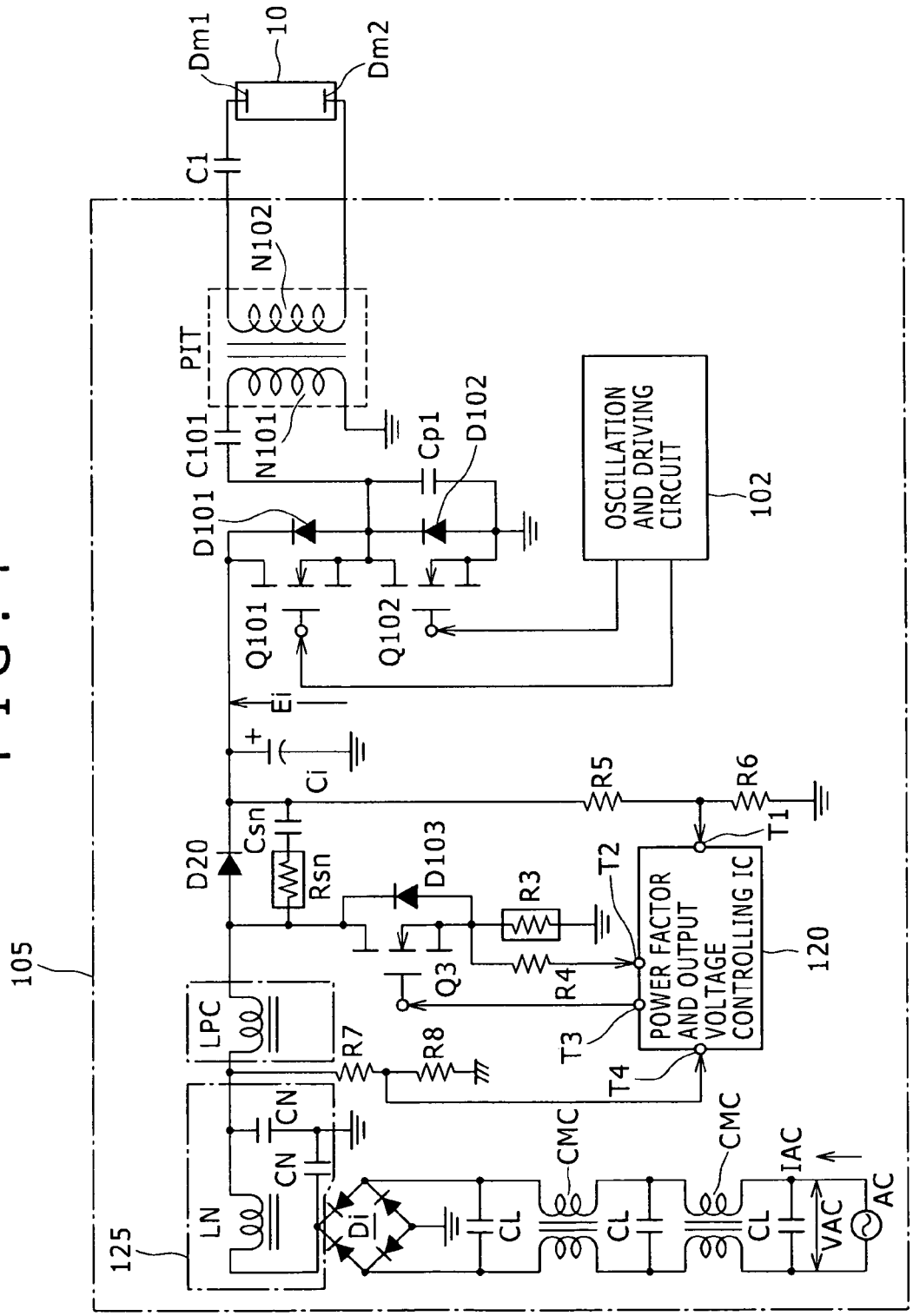
FIG. 4 shows a circuit example of a drive and control circuit according to the embodiment.
Figure 5A:
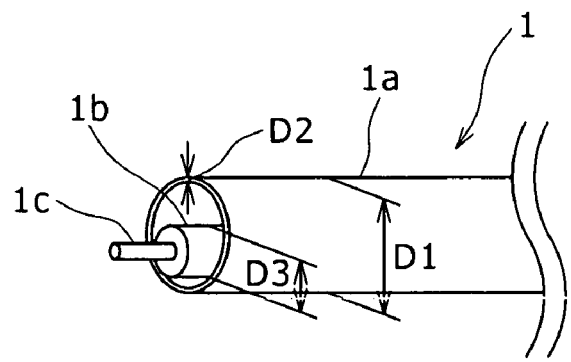
FIGS. 5A to 5C show wire harnesses according to the embodiment.
Figure 5B:
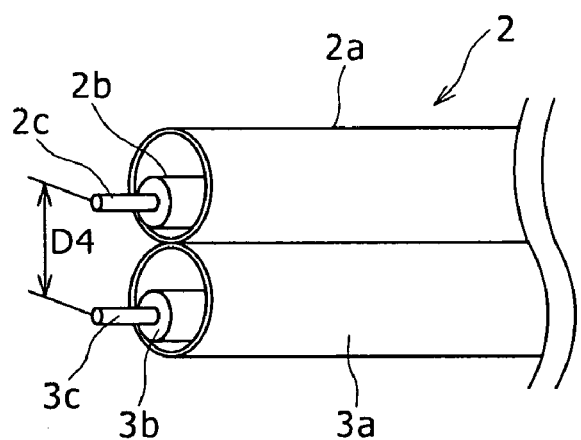
Figure 5C:
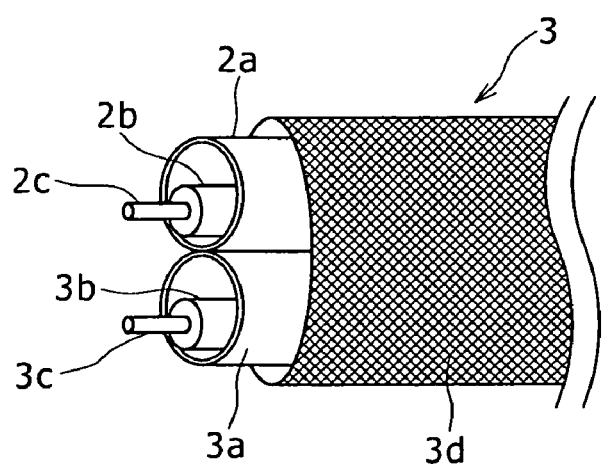
Figure 6:
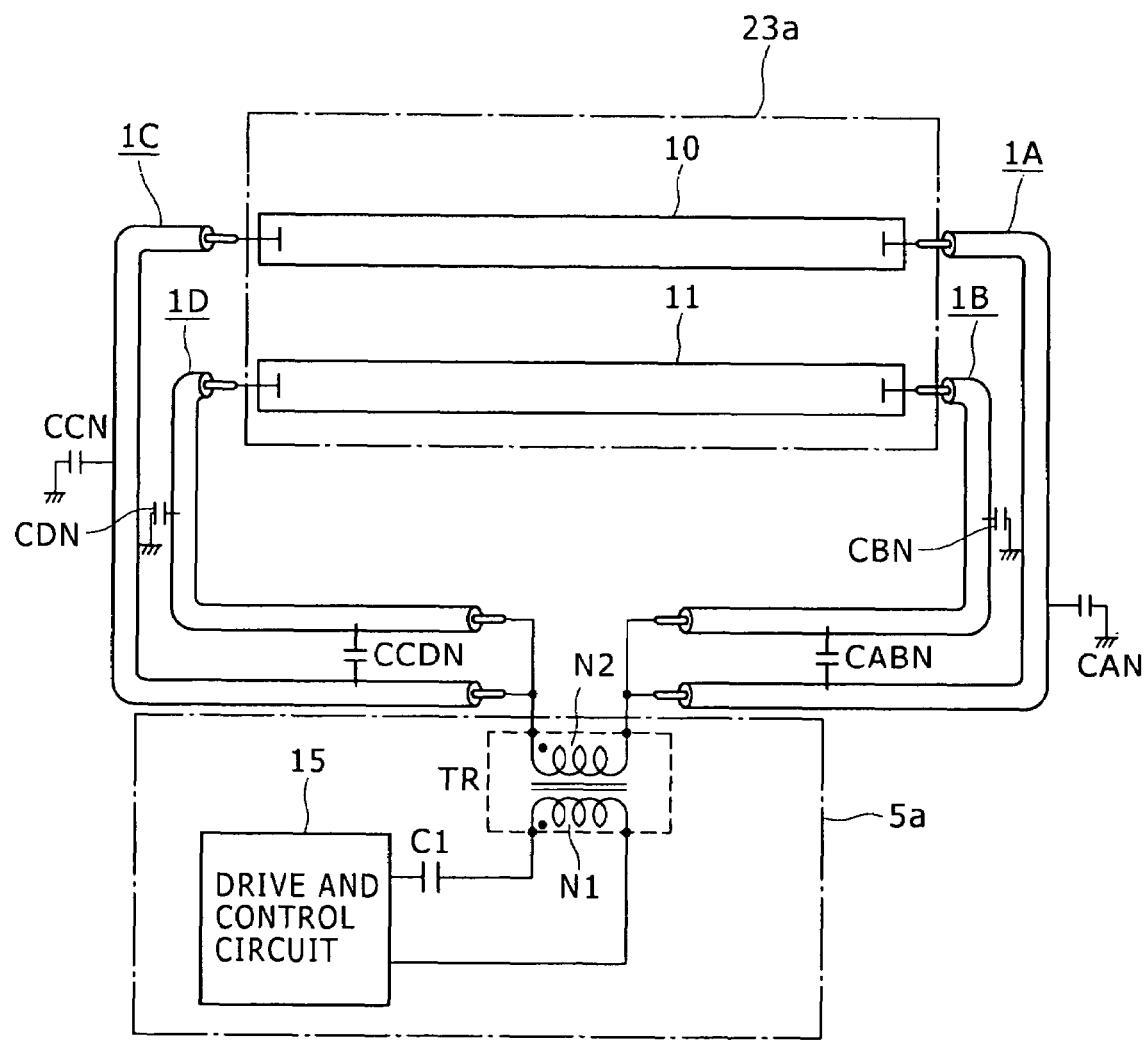
FIG. 6 is a diagram showing a connection between a drive and control unit and a lighting unit using a wire harness in the embodiment.
Figure 7:
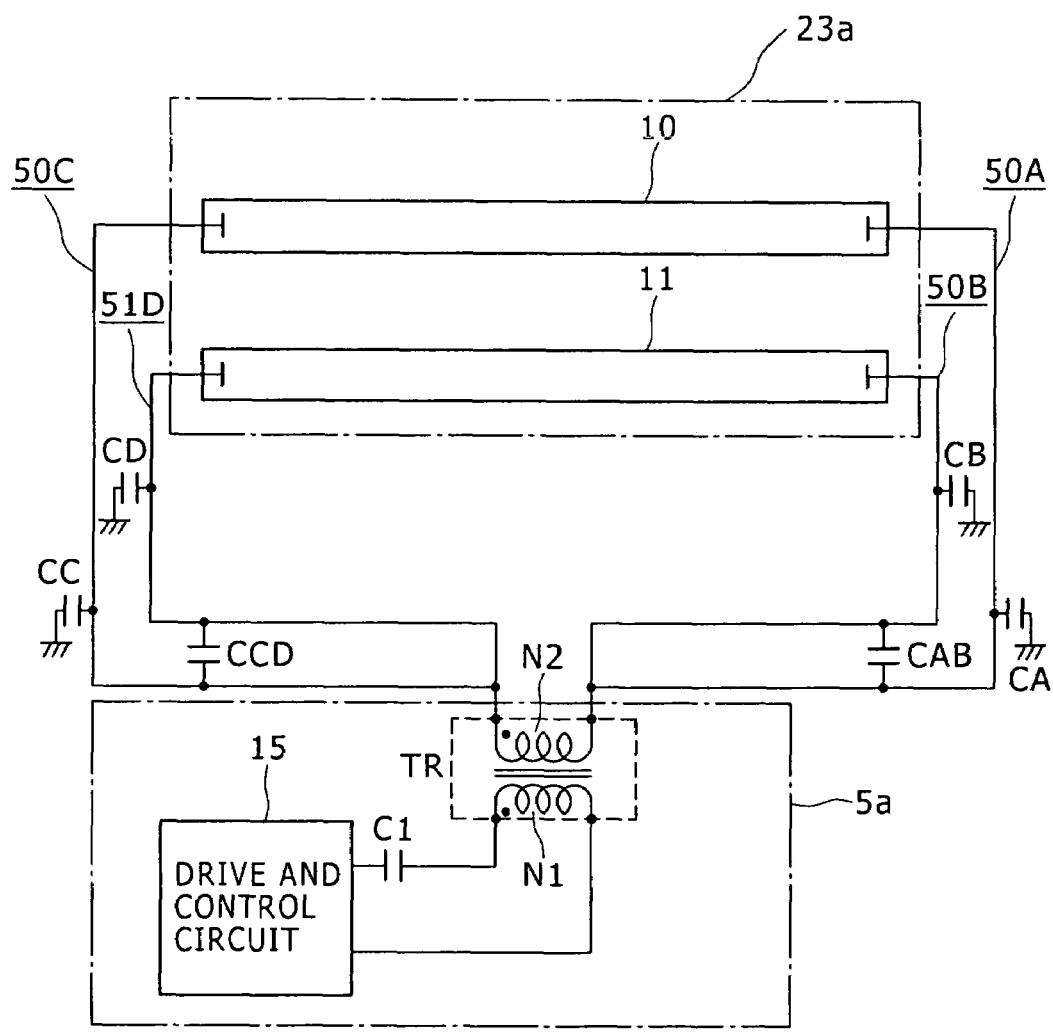
FIG. 7 is a diagram showing a connection between a drive and control unit and a lighting unit using a wire harness in a comparison example.
Figure 8A:
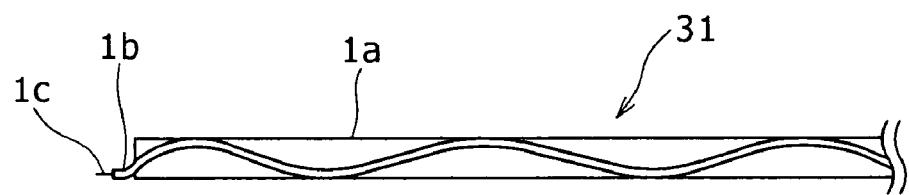
FIGS. 8A to 8C show wire harnesses according to embodiments.
Figure 8B:
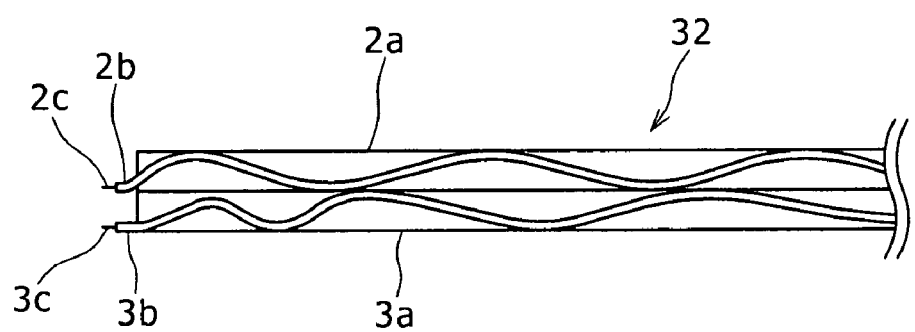
Figure 8C:
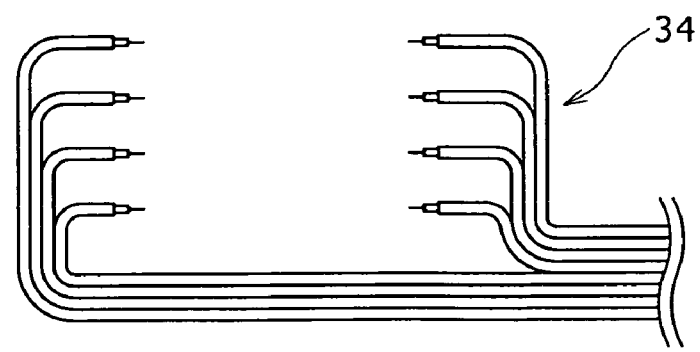
Figure 13:
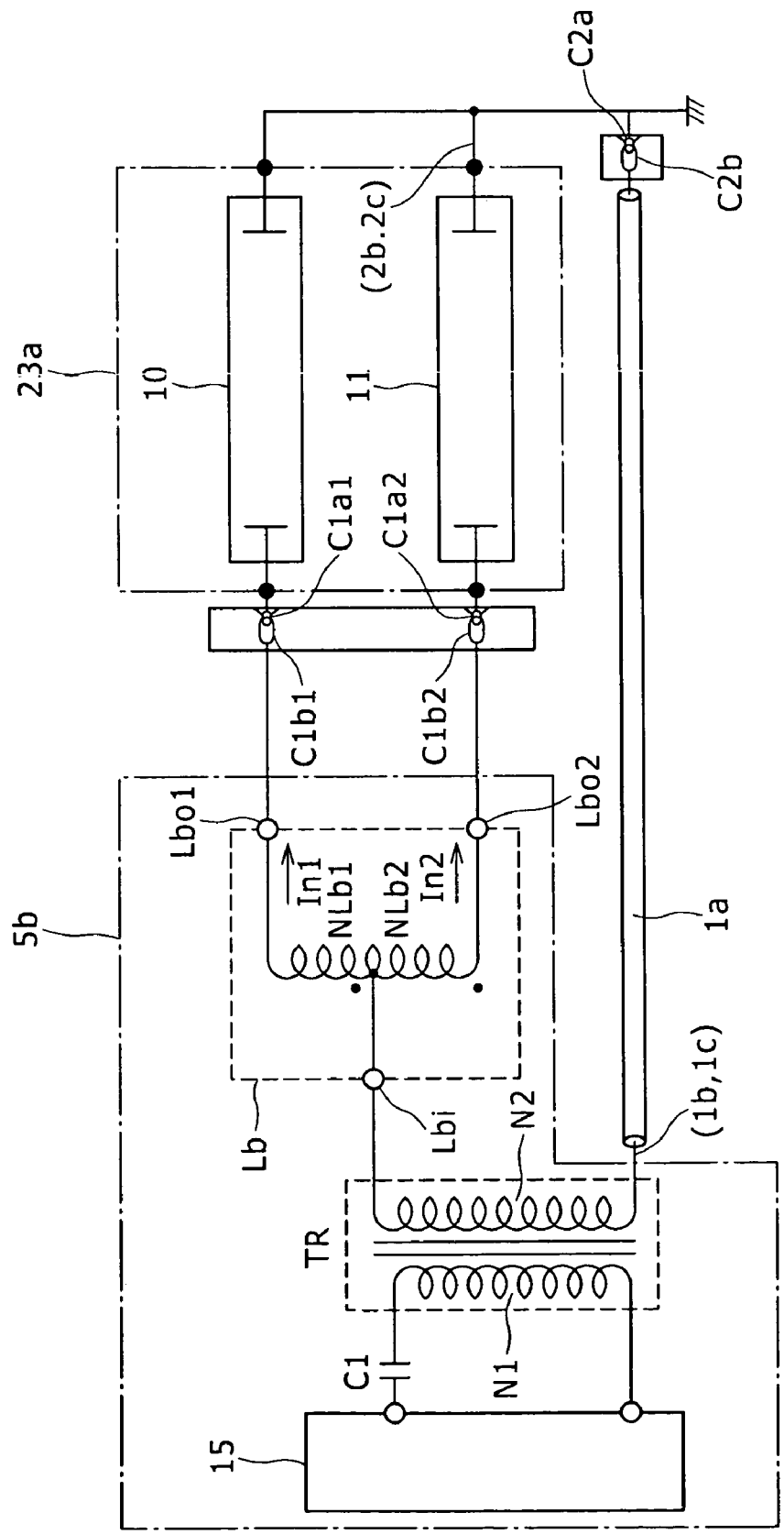
FIG. 13 is a diagram showing a connection between a drive and control unit and a lighting unit using a wire harness according to the embodiment.
Figure 14:
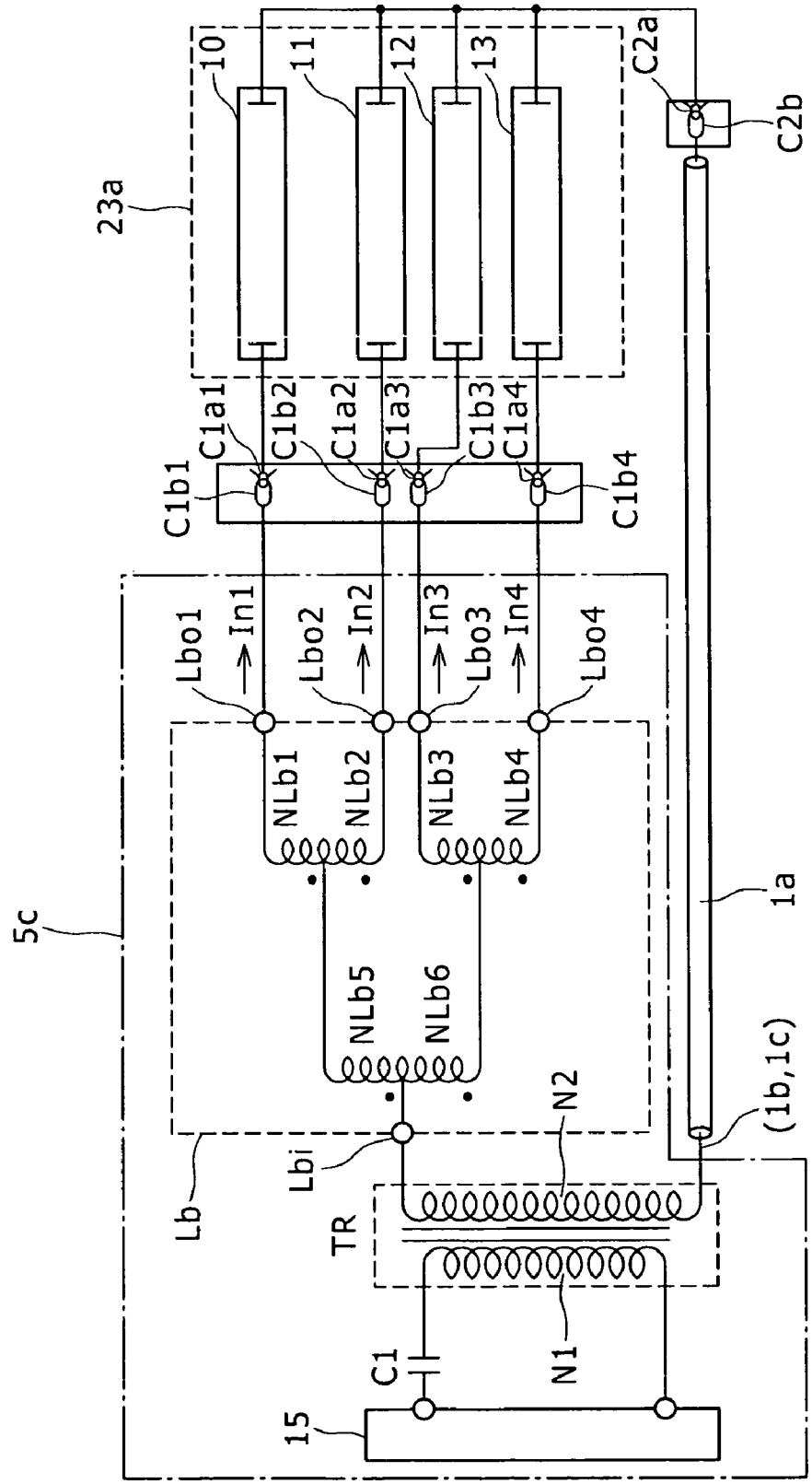
FIG. 14 is a diagram showing a connection between a drive and control unit and a lighting unit using a wire harness according to the embodiment.
Figure 15:
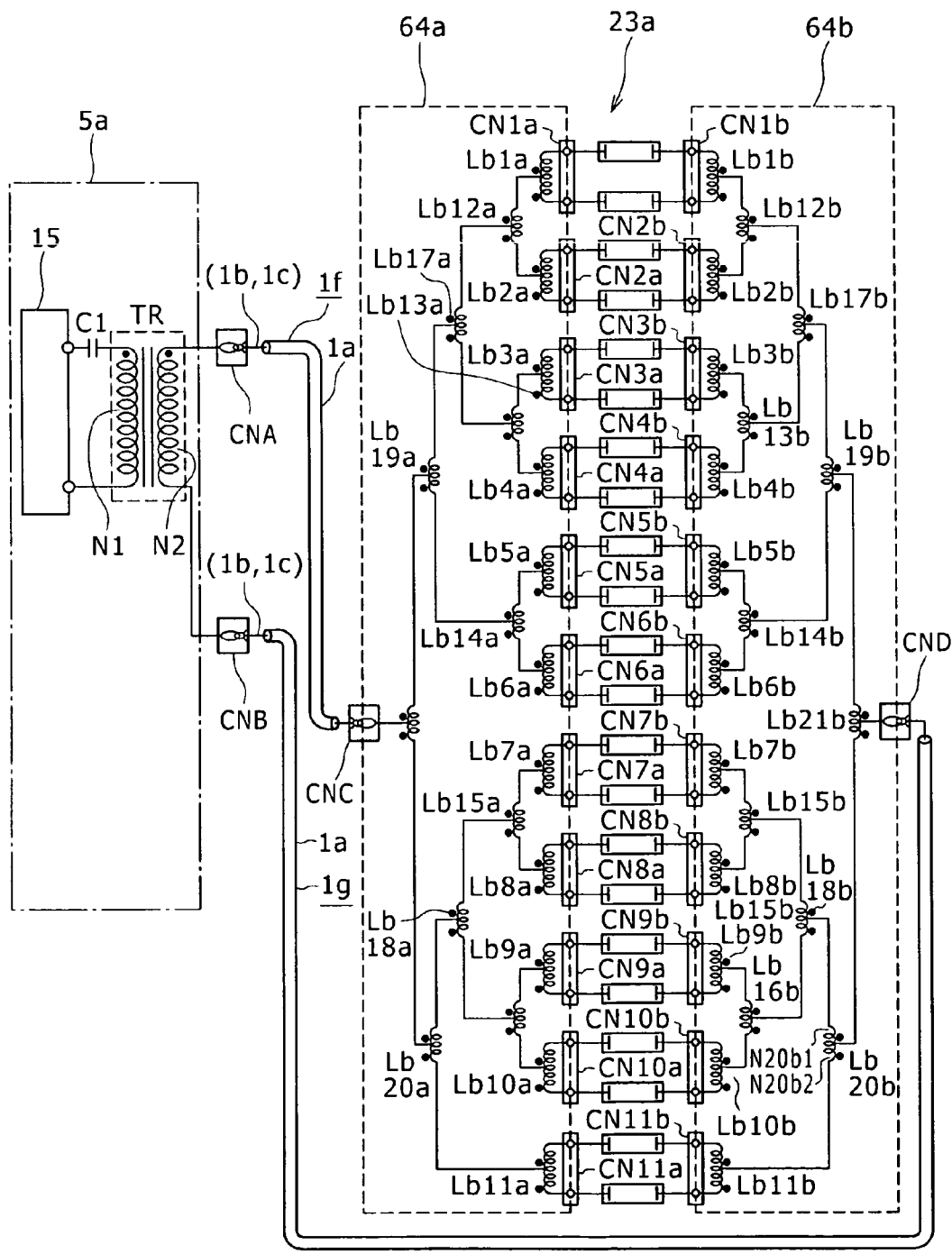
FIG. 15 is a diagram showing a backlight device using a wire harness according to the embodiment.
Figure 16:
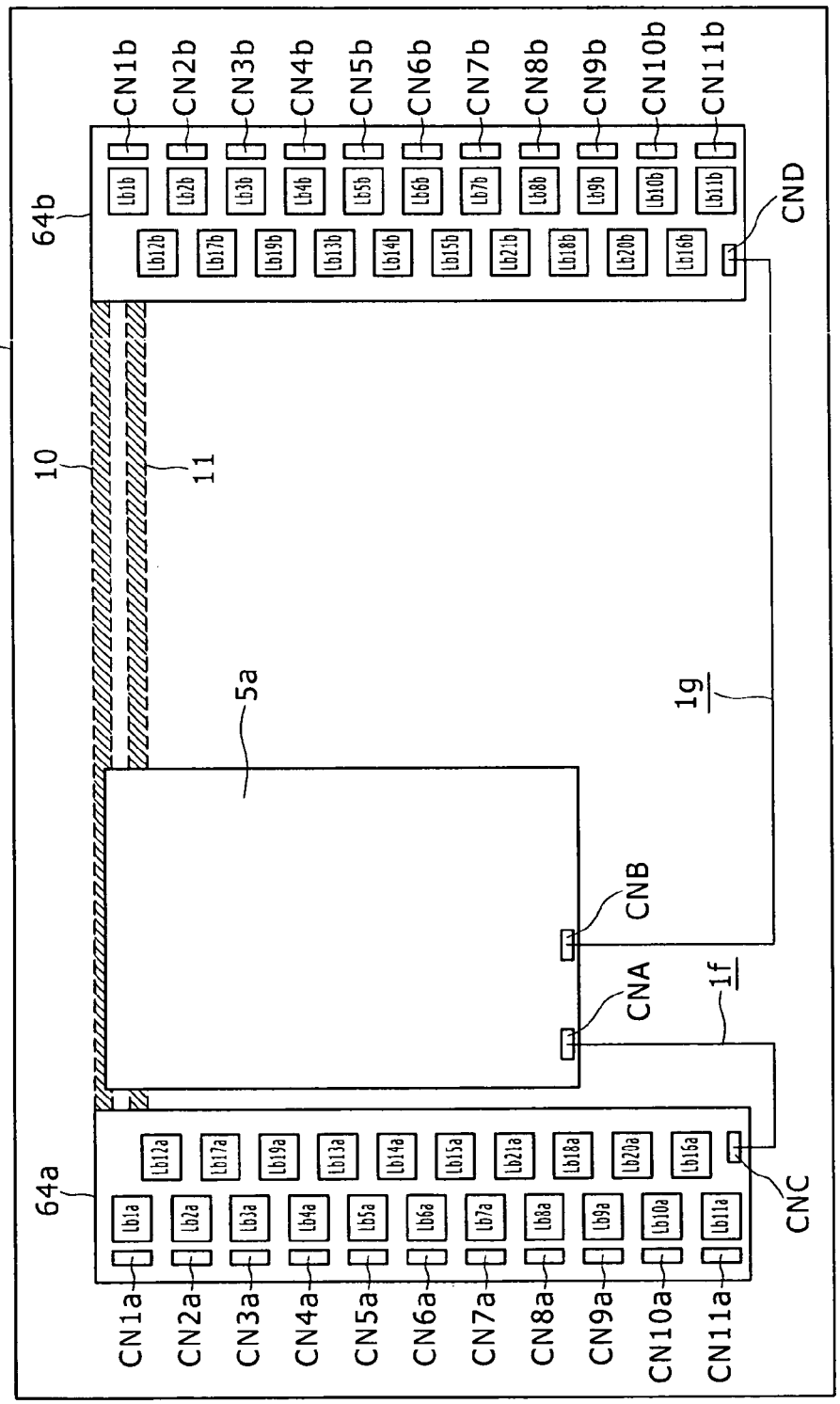
FIG. 16 is a diagram showing an arrangement of constituent parts in a liquid crystal display device according to an embodiment.

Preferred embodiments will hereinafter be described with reference to the drawings. Referring to FIGS. 1A and 1B and FIG. 2, description will first be made of a common liquid crystal display device. Referring to FIG. 3, description will be made of a backlight device formed with main parts of a drive and control unit used in the liquid crystal display device and functioning as an example of a driving power supply unit in an embodiment and a cold cathode fluorescent tube functioning as an example of a load circuit in the embodiment. Another embodiment of a drive and control circuit of the drive and control unit is shown in FIG. 4, and description thereof will be made. Referring to FIGS. 5A to 5C, description will be made of the structures and effects of wire harnesses. Then, referring to FIG. 6, description will be made of a connection between a drive and control unit and a lighting unit using wire harnesses according to an embodiment. Referring to FIG. 7, description will be made of a connection between a drive and control unit and a lighting unit using wires according to an example for comparison. FIGS. 8A to 8C show wire harnesses according to other embodiments. Referring to FIGS. 9 to 14, description will be made of modes of connection between a drive and control unit and a lighting unit using wire harnesses according to various embodiments, and description will be made of backlight devices. Referring to FIG. 15 and FIG. 16, description will be made of modes of connection between a drive and control unit and a lighting unit using wire harnesses according to various embodiments, and description will be made of a backlight device and a liquid crystal display device. Further, referring to FIG. 17, description will be made of a lighting device using wire harnesses and intended exclusively for lighting.

(Description of Liquid Crystal Display Device)

First, referring to external views of FIGS. 1A and 1B and a block diagram of FIG. 2, description will be made of a liquid crystal display device according to an embodiment. The perspective view of FIG. 1A is an external view of the liquid crystal display device when a liquid crystal panel display surface 61 as a front surface side (video viewing surface side) of a liquid crystal panel 22 (see FIG. 2) is viewed obliquely from below. The perspective view of FIG. 1B is an external view of the liquid crystal display device when a back surface side (a side that is not the video viewing surface side) as a surface on an opposite side from the liquid crystal panel display surface 61 is viewed obliquely from above.

The liquid crystal panel display surface 61 and a chassis 63 are fixed to and retained by a casing 62 disposed so as to enclose four sides, that is, an upper side, a lower side, a left side, and a right side. On the chassis 63, main electric circuits including a balance coil unit 64a and a balance coil unit 64b to be described later at end parts on both sides of the liquid crystal display device are fixed by spring members 65a to 65d shown in FIG. 1B and the like via plastic holders, respectively. The chassis 63 is formed by iron or aluminum having electric conductivity.

A plurality of cold cathode fluorescent tubes, for example 22 cold cathode fluorescent tubes, not shown in the figure, are arranged between the back surface side of the liquid crystal panel display surface 61 and the chassis 63. The cold cathode fluorescent tubes have a long and narrow cylindrical shape. The cold cathode fluorescent tubes are arranged in parallel with each other in a longitudinal direction of the liquid crystal panel display surface 61 (a lateral direction of a paper surface of FIG. 1) so as to be parallel with a longitudinal direction of the casing 62. Each of the cold cathode fluorescent tubes has an electrode at both end parts thereof. The respective electrodes arranged at both ends of each of the plurality of cold cathode fluorescent tubes are supplied with power from each of the balance coil unit 64a and the balance coil unit 64b. Thus, the balance coil unit 64a and the balance coil unit 64b are arranged in the vicinity of the electrodes of each of the cold cathode fluorescent tubes to uniformize currents flowing in the cold cathode fluorescent tubes. The balance coil unit 64a and the balance coil unit 64b are supplied with power using a wire harness extending over a long distance from a driving power supply unit. For reduced thickness of the liquid crystal display device, the wire harness is disposed in proximity to the chassis 63 formed by iron or aluminum. This will be described later in detail with reference to FIG. 15 and FIG. 16.

FIG. 2 is a block diagram showing the liquid crystal display device 20. A video signal is input from a video terminal tv in the liquid crystal display device 20. The video signal is supplied to a panel driving unit 21. The panel driving unit 21 performs necessary video signal processing on the input video signal, and thereby generates a driving signal to drive the liquid crystal panel 22 so that an image is displayed on the basis of the input video signal. The liquid crystal panel 22 performs an operation according to the driving signal thus generated in the panel driving unit 21 to display the image according to the video signal. However, this image cannot be seen by eyes.

A lighting unit 23 has a cold cathode fluorescent tube as a light source. The lighting unit 23 is driven by a drive and control unit 5 to function as a light source. Light is transmitted from the back surface (a surface on an opposite side from the image viewing surface), whereby the image corresponding to the video signal can be seen by eyes on the image viewing surface of the liquid crystal panel 22. The drive and control unit 5 and the panel driving unit 21 are controlled collectively by a control unit 24 so as to operate in a coordinated manner.

As a principle diagram of the drive and control unit 5 driving the cold cathode fluorescent tube, FIG. 3 shows the drive and control unit 5 having a drive and control circuit 15 for driving one cold cathode fluorescent tube 10 as a main component part. The drive and control circuit 15 includes an oscillating and driving circuit 6, a transistor Q1, and a transistor Q2. The oscillating and driving circuit 6 drives the bases of the transistor Q1 and the transistor Q2. The collector of the transistor Q1 is connected to a direct-current voltage positive electrode side Vin+ from which a direct-current voltage is supplied to the drive and control unit 5. The emitter of the transistor Q1 is connected to the collector of the transistor Q2. The emitter of the transistor Q2 is connected to a direct-current voltage negative electrode side Vin−. In order to reduce a loss in the transistor Q1 and the transistor Q2, the transistor Q1 and the transistor Q2 are controlled so as to alternately repeat two states, that is, a conducting state and an off state. When the transistor Q1 is conducting, the transistor Q2 is off. When the transistor Q1 is off, the transistor Q2 conducts. A square-wave voltage occurs at a node of the emitter of the transistor Q1 and the collector of the transistor Q2.

The square-wave voltage is applied to an electrode Dm1 and an electrode Dm2 of the cold cathode fluorescent tube 10 via a capacitor C1. The capacitor C1 is to change the potential amplitudes of the electrode Dm1 and the electrode Dm2 to same positive and negative levels with a voltage corresponding to a middle point potential retained by the capacitor C1.

While it is of course possible to drive the cold cathode fluorescent tube by such a square-wave voltage, the present embodiment converts the current to be supplied to the cold cathode fluorescent tube into a sinusoidal wave using a resonant circuit to reduce undesired radiation. FIG. 4 shows a drive and control unit 105 using a resonant circuit. A resonant circuit formed by a transformer TR and a capacitor C1 shown in FIG. 6 may be used, as will be described later.

Description will be made of the drive and control unit 105 using the resonant circuit shown in FIG. 4. The drive and control unit 105 is formed by connecting a current resonant converter in a stage subsequent to an active filter. The drive and control unit 105 has a so-called wide range capability for dealing with alternating input voltages of an AC 100 V system and an AC 200 V system. The active filter is added to improve a power factor. The current resonant converter employs a configuration of an externally excited half-bridge coupling system.

In the drive and control unit 105, a common mode noise filter formed by connecting two common mode choke coils CMC and three across capacitors CL is connected to a commercial alternating-current power supply AC in a connection mode shown in FIG. 4. A bridge rectifier circuit Di is connected in a stage subsequent to the common mode noise filter. The rectified output line of the bridge rectifier circuit Di is connected with a normal mode noise filter 125 formed by connecting one choke coil LN and two filter capacitors CN as shown in the figure. The positive output terminal of the normal mode noise filter 125 is connected to the positive electrode terminal of a smoothing capacitor Ci via a series connection of an inductor LPC and a fast recovery type rectifier diode D20. An RC snubber circuit formed by a capacitor Csn and a resistance Rsn is connected in parallel with the rectifier diode D20.

A MOS-FET having a body diode D103 is selected as a switching element Q3. The switching element Q3, the inductor LPC, the rectifier diode D20, and the smoothing capacitor Ci form a step-up type switching regulator, and form a principal part of the active filter for power factor improvement. A power factor and output voltage controlling circuit 120 is an integrated circuit (IC) for controlling the operation of the active filter for performing power factor improvement so as to bring the power factor close to one. The power factor and output voltage controlling circuit 120 includes for example a multiplier, a divider, an error voltage amplifier, a PWM control circuit, and a drive circuit for outputting a drive signal for switching-driving of the switching element.

The value of a voltage obtained by dividing a voltage (rectified and smoothed voltage Ei) across the smoothing capacitor Ci by voltage dividing resistances R5 and R6 is input to a terminal T1 of the power factor and output voltage controlling circuit 120. A signal corresponding to a current flowing through the bridge rectifier circuit Di is input from a node of a resistance R3 inserted between the source of the switching element Q3 and a primary side ground to a terminal T2 via a resistance R4. In addition, a ripple current voltage resulting from full-wave rectification which voltage is obtained at an output of the bridge rectifier circuit Di is divided by a resistance R7 and a resistance R8, and then input to a terminal T4. The power factor and output voltage controlling circuit 120 performs control so as to maintain the value of the voltage obtained by dividing the voltage across the smoothing capacitor Ci by the voltage dividing resistances R5 and R6 at a predetermined value and thus make the voltage constant, and equalize the voltage obtained by dividing the ripple current voltage by the resistance R7 and the resistance R8 to the voltage input to the terminal T2 via the resistance R4, thus bringing the power factor close to one. Incidentally, a power supply unit for supplying power to the power factor and output voltage controlling circuit 120 and a power supply unit for supplying power to an oscillating and driving circuit to be described later in the drive and control unit 105 are not shown in FIG. 4.

In the current resonant converter in the stage subsequent to the above-described active filter, a switching element Q101 and a switching element Q102 formed by two MOS-FETs are connected by a half-bridge connection, and connected in parallel with the smoothing capacitor Ci, as shown in FIG. 4. That is, the current resonant converter of the half-bridge coupling type is formed. The current resonant converter in this case is externally excited. A body diode D101 and a body diode D102 each form a path for passing an opposite-direction current when the switching element Q101 and the switching element Q102 are turned off. An oscillating and driving circuit 102 switching-drives the switching element Q101 and the switching element Q102 at a necessary switching frequency in timing in which the switching element Q101 and the switching element Q102 are alternately turned on/off.

A converter transformer PIT is provided to transmit a switching output obtained by the switching element Q101 and the switching element Q102 from a primary side to a secondary side. One end part of a primary winding N1 of the converter transformer PIT is connected to a node of the switching element Q101 and the switching element Q102 via a series resonant capacitor C101. Another end part of the primary winding N1 of the converter transformer PIT is connected to the primary side ground. A capacitance of the series resonant capacitor C101 and a leakage inductance occurring across the primary winding N1 form a series resonant circuit. The series resonant circuit performs a resonant operation by being supplied with the switching output. A capacitor Cp1 forms a partial voltage resonant circuit to reduce a loss in the switching element Q101 and the switching element Q102.

A secondary winding N2 is wound on the secondary side of the converter transformer PIT. A voltage in the form of a sinusoidal wave corresponding to the resonant operation is obtained from the secondary winding N2. An appropriate selection of a turns ratio between the primary winding N1 and the secondary winding N2 provides a desired voltage between the electrode Dm1 and the electrode Dm2 of the cold cathode fluorescent tube 10. The capacitor C1 is to cut off a DC component. However, since no direct-current voltage is transmitted to the secondary winding N2, the secondary winding N2 may be connected directly to the electrode Dm1 and the electrode Dm2 without the capacitor C1 being provided.

(Description of Wire Harnesses)

FIGS. 5A to 5C show wire harnesses according to the present embodiment. FIGS. 5A to 5C are diagrams of wire harnesses as viewed from a terminating side thereof. The wire harness 1 shown in FIG. 5A includes one conductive member 1c. This wire harness 1 includes the conductive member 1c, a covering member 1b for enclosing and covering the conductive member 1c, the covering member 1b being formed of an insulating material, and a retaining member 1a for enclosing the covering member 1b with a space, the retaining member 1a being formed of an insulating material. The outside diameter of the retaining member 1a is represented by a distance D1, the thickness of the insulating material of the retaining member 1a is represented by a distance D2, and the diameter of the covering member 1b is represented by a distance D3.

The wire harness 2 shown in FIG. 5B includes two conductive members 2c and 3c. This wire harness 2 includes the conductive member 2c, a covering member 2b for enclosing and covering the conductive member 2c, the covering member 2b being formed of an insulating material, and a retaining member 2a for enclosing the covering member 2b with a space, the retaining member 2a being formed of an insulating material, and the conductive member 3c, a covering member 3b for enclosing and covering the conductive member 3c, the covering member 3b being formed of an insulating material, and a retaining member 3a for enclosing the covering member 3b with a space, the retaining member 3a being formed of an insulating material. The retaining member 2a and the retaining member 3a are arranged in substantially close contact with each other and substantially in parallel with each other. The retaining member 2a and the retaining member 3a may be brought into close contact with each other by bonding the retaining member 2a and the retaining member 3a to each other by an adhesive or the like, by binding together the retaining member 2a and the retaining member 3a by a binding band, or by forming the retaining member 2a and the retaining member 3a integrally with each other in advance. A distance from the center of the conductive member 2c to the center of the conductive member 3c is represented by a distance D4.

The wire harness 3 shown in FIG. 5C is formed by adding a shield 3d to the wire harness 2 shown in FIG. 5B. The shield 3d is formed by a conductive material in a mesh form or a plane form surrounding the retaining member 2a and the retaining member 3a. The shield 3d may be formed by winding a tape in a mesh form or a plane form around the wire harness 2, or may be formed by inserting the wire harness 2 into the shield 3d with a space, the shield 3d being formed by a hollow tube formed in advance. The thus shielded wire harness 3 has better characteristics with respect to undesired electromagnetic radiation.

Each of the wire harness 1, the wire harness 2, and the wire harness 3 described above has a predetermined length, and has a predetermined shape as occasion demands. The predetermined shape does not necessarily need to be the same as a final shape when the wire harness is mounted in the device, and includes a shape that facilitates the mounting of the wire harness in the device. Mounting members (connectors) for easy connection of both ends of the wire harnesses to electric members may be connected to these wire harnesses in advance.

In each of the wire harness 1, the wire harness 2, and the wire harness 3 described above, there is a space between the covering member and the retaining member. This space not only has an effect of improving a characteristic feature to be described later but also has an effect of making it possible to form such a wire harness by passing the conductive member (covered wire) covered by the covering member through the hollow part of the retaining member at a time of manufacturing the wire harness.

While the wire harnesses shown in FIGS. 5A to 5C include one conductive member or two conductive members, a similar structure can be used when a wire harness has three or more conductive members. A wire harness having the above-described structure can prevent damage to the covering because the covered wire is retained in the retaining member.

Electrical characteristics of a wire harness having such a structure will next be described. First, referring to FIG. 5A, description will be made of characteristics common to all. The retaining member 1a has a strength such that the retaining member 1a does not undergo much deformation even when the retaining member 1a is mounted in the device. Thus, the sectional shape of the wire harness 1 hardly changes. Therefore, the distance D1 as the outside diameter of the retaining member 1a, the distance D2 as the thickness of the insulating material of the retaining member 1a, and the distance D3 as the outside diameter of the covering member 1b retain a substantially constant value. Since the retaining member 1a is disposed in proximity to the conductive material casing of the device, for example the chassis 63 formed by iron or aluminum (see FIG. 11), a capacitance occurs between the conductive member 1c and the conductive material casing.

Description will be made of correlations between the distance D1, the distance D2, and the distance D3 and the magnitude of the capacitance. The distance D3 as the outside diameter of the covering member 1b is determined by the magnitude of a current flowing through the conductive member 1c and a voltage applied to the conductive member 1c. In the present embodiment, the distance D3 is a diameter of 2.7 mm (millimeters). The inventor of the present application directed attention to a fact that the magnitude of a current flowing in a fluorescent display tube is changed according to the magnitudes of both the distances D1 and D2 when the distance D1 as the outside diameter of the retaining member 1a and the distance D2 as the thickness of the insulating material of the retaining member 1a are variously changed with the distance D3 as the outside diameter of the covering member 1b fixed at a diameter of 2.7 mm, and a constant power is output from the drive and control unit. The inventor obtained desirable relation between the distance D1, the distance D2, and the distance D3 by experiment.

EMBODIMENTS

Embodiments will hereinafter be described. FIG. 6 is an embodiment of a backlight device that emits light from the back of an image display surface. The backlight device shown in FIG. 6 includes a part of a lighting unit 23a as an embodiment of the lighting unit 23 shown in FIG. 2, a drive and control unit 5a as an embodiment of the drive and control unit 5 shown in FIG. 3, and wire harnesses 1A to 1D having a similar structure to that of the wire harness 1 shown in FIG. 5A. That is, the present embodiment is an embodiment of a backlight device that emits light from the back of an image display surface, the backlight device including: the drive and control unit 5a functioning as a driving power supply unit for supplying alternating-current power; the lighting unit 23a having cold cathode fluorescent tubes supplied with the alternating-current power and a casing retaining the cold cathode fluorescent tubes; wire harnesses including the wire harnesses 1A to 1D functioning as a conductive member covered by an insulating material, the conductive member connecting the drive and control unit 5a and the cold cathode fluorescent tubes to each other for electric conduction between the drive and control unit 5a and the cold cathode fluorescent tubes, the conductive member being enclosed with a space by a retaining member made of an insulating material and being disposed along the casing, the retaining member suppressing a leak of the alternating-current power.

While in the embodiment, the lighting unit 23a is formed by arranging 22 cold cathode fluorescent tubes in parallel with each other, FIG. 6 shows only two cold cathode fluorescent tubes 10 and 11, and does not show the 20 other cold cathode fluorescent tubes.

The drive and control unit 5a has a transformer TR in addition to the drive and control unit 5 shown in FIG. 3. The transformer TR has a primary winding N1 and a secondary winding N2. Since a leakage inductance is increased by lowering a degree of coupling between the primary winding N1 and the secondary winding N2, the leakage inductance and the capacitance of a capacitor C1 form a resonant circuit, so that a substantially sinusoidal waveform occurs at the secondary winding N2 of the transformer TR. A current in such a sinusoidal form flows through the wire harnesses 1A to 1D and the 40 other wire harnesses not shown in FIG. 6 to light the cold cathode fluorescent tube 10 and the cold cathode fluorescent tube 11 and the 20 other cold cathode fluorescent tubes not shown in FIG. 6. Therefore, undesired electromagnetic radiation is reduced as compared with a case where the cold cathode fluorescent tubes are lit by a square wave. A drive and control circuit 15 is supplied with 300 V (volts), for example, as a direct-current voltage. By appropriately adjusting a turns ratio between the primary winding N1 and the secondary winding N2 of the transformer TR, the secondary winding N2 is provided with 700 V (RMS value).

While the drive and control circuit 15 shown in FIG. 3 is used as the drive and control circuit in the drive and control unit 5a, the drive and control circuit 105 using the resonant circuit shown in FIG. 4 may also be used. In this case, the converter transformer PIT disposed in the drive and control circuit 105 can be used in place of the transformer TR, and each of the 44 wire harnesses including the wire harnesses 1A to 1D connected to the secondary winding N2 of the transformer TR in FIG. 6 is connected to the secondary winding N102 of the converter transformer PIT. Thus, the 22 cold cathode fluorescent tubes including the cold cathode fluorescent tube 10 and the cold cathode fluorescent tube 11 can be driven. When the drive and control circuit 105 is used, the capacitor C1 does not necessarily need to be provided. The drive and control circuit 105 may be used in place of the drive and control circuit 15 in each of the embodiments below of FIG. 7, FIG. 9, and FIG. 15. In this case, as described above, since the converter transformer PIT prevents a DC component from being transmitted to the secondary side, the capacitor C1 does not necessarily need to be provided.

Each of the wire harness 1A, the wire harness 1B, the wire harness 1C, and the wire harness 1D has the same structure as the wire harness 1 shown in FIG. 5A. While the 44 wire harnesses having the same structure are used, FIG. 6 shows only the four wire harnesses and does not show the 40 other wire harnesses. Incidentally, the wire harnesses 1A to 1D and the 40 other wire harnesses do not have a same length, but are cut to predetermined lengths in advance. The use of such wire harnesses makes it possible to manufacture the liquid crystal display device in a short time, and improve mass production effects.

In the present embodiment, an average value of lengths of the 44 wire harnesses is 750 mm, which is longer than 100 mm in a case of providing a drive and control circuit for each cold cathode fluorescent tube and connecting the drive and control circuit and the cold cathode fluorescent tube to each other (not shown). Incidentally, the 44 wire harnesses may be grouped into larger wire harnesses by binding together the 22 wire harnesses on a right side (including the wire harness 1A and the wire harness 1B) by a binding band and binding together the 22 wire harnesses on a left side (including the wire harness 1C and the wire harness 1D) by a binding band, and forming the 22 wire harnesses on the right side and the 22 wire harnesses on the left side into predetermined shapes. However, the 44 wire harnesses in the present embodiment are independent from each other. In the present embodiment, the distance D3 as the outside diameter of the covering member 1b is 2.7 mm (millimeters), as described above, the distance D1 as the outside diameter of the retaining member 1a is 4 mm, and the distance D2 as the thickness of the insulating material of the retaining member 1a is 0.5 mm. An average value of magnitudes of currents flowing in the 22 cold cathode fluorescent tubes in this case is 5.859 mA (milliamperes: RMS value). Incidentally, polyethylene is used as the insulating material for the retaining member.

Comparison Example

FIG. 7 shows a comparison example for comparison with the embodiment. In the comparison example, unlike the embodiment, wiring between a drive and control unit 5a and cold cathode fluorescent tubes arranged in a lighting unit 23 is performed by wire harnesses without a retaining member 1a, that is, by covered wires formed by putting a covering member 1b around a conductive member 1c. In FIG. 6, the respective covered wires formed by putting a covering member 1b around a conductive member 1c are identified by reference 50A, reference 50B, reference 50C, and reference 50D. An average value of magnitudes of currents flowing in 22 cold cathode fluorescent tubes when the covered wires having exactly the same structure and the same length as in the embodiment with the distance D3 set at a diameter of 2.7 mm (millimeters) is 5.446 mA (milliamperes: RMS value).

Since the brightness of a cold cathode fluorescent tube is proportional to a current flowing in the cold cathode fluorescent tube, it is necessary to compensate for a leakage current in order to make the cold cathode fluorescent tube have a predetermined brightness. In the above-described example, a 7% increase in leakage current in the wire harness without a retaining member 1a is observed, which increase is equivalent to a 7% decrease in power conversion efficiency of the above-described power supply unit. Hence, in order to compensate for this decrease, the power supplied to the wire harness needs to be increased by 7% as compared with the case of using a wire harness with a retaining member 1a. Conversely, the use of a wire harness with a retaining member 1a is equivalent to a 7% increase in power conversion efficiency.

Thus, when the same power is supplied from the drive and control unit 5a, the wire harness having the retaining member 1a can send a higher current to the cold cathode fluorescent tube than the wire harness without the retaining member 1a, thus allowing more effective use of the power supplied from the drive and control unit 5a. As a result, the power efficiency of the liquid crystal display device is improved, and the power is saved.

Difference Between Leakage Currents in Embodiment and Comparison Example

The inventor of the present application supposes that a major factor in such a power reducing effect produced when the wire harness has the retaining member 1a is the magnitude of leakage current from the wire harness. That is, it is considered that not all of the power supplied from the drive and control unit 5a reaches the cold cathode fluorescent tubes because capacitances between each of the wire harness 1A and the like shown in FIG. 6 or the wire harness 50A and the like shown in FIG. 7 and the chassis formed by iron or aluminum as well as capacitances between the wire harnesses such as the wire harness 1A and the like or capacitances between the wire harnesses such as the wire harness 50A and the like cause a power supplied from the drive and control unit 5a to leak as a leakage current. As a result, the magnitudes of currents reaching the cold cathode fluorescent tubes are decreased.

That is, both a leakage current from the wire harness 1A shown in FIG. 6 and a leakage current from the wire harness 50A shown in FIG. 7 are increased as a voltage applied to the wire harnesses becomes higher, increased as the length of the wire harnesses becomes longer, and increased as the wire harnesses become closer to the metallic chassis. For example, when the voltage applied to the wire harnesses is a sinusoidal-wave voltage of about 700 V, the length of the wire harnesses is a few ten cm (centimeters) to about 1 m, and the wire harnesses adhere closely to the metallic chassis by an adhesive, an adhesive tape or the like, a difference between the magnitude of the leakage current from the wire harness 1A and the magnitude of the leakage current from the wire harness 50A may not be ignored. A tendency for the leakage current to increase is accelerated more with an increase in screen size and a decrease in thickness of the liquid crystal display device.

Description will first be made of the capacitances that cause the leakage current to occur. FIG. 6 and FIG. 7 schematically show a part of these capacitances that actually exist. In FIG. 6, a capacitance CAN is a capacitance between the wire harness 1A and the iron or aluminum chassis. A capacitance CBN is a capacitance between the wire harness 1B and the iron or aluminum chassis. A capacitance CCN is a capacitance between the wire harness 1C and the iron or aluminum chassis. A capacitance CDN is a capacitance between the wire harness 1D and the iron or aluminum chassis. A capacitance exists between each of the 40 other wire harnesses and the iron or aluminum chassis. However, the capacitances between the 40 other wire harnesses and the iron or aluminum chassis are not shown in FIG. 6.

A capacitance CABN is a capacitance existing between the wire harness 1A and the wire harness 1B. A capacitance CCDN is a capacitance existing between the wire harness 1C and the wire harness 1D. Further, capacitances exist between the 40 other wire harnesses running in parallel with each other, but are not shown in FIG. 6. Incidentally, capacitances exist between the wire harness 1A and the wire harness 1C or the wire harness 1D and between the wire harness 1B and the wire harness 1C or the wire harness 1D. However, since the wire harness 1A and the wire harness 1B are disposed separately from the wire harness 1C and the wire harness 1D with the wire harness 1A and the wire harness 1B extending in a right direction and the wire harness 1C and the wire harness 1D extending in a left direction, the capacitances between the wire harnesses extending in the right direction and the wire harnesses extending in the left direction are small values that do not need to be considered.

In FIG. 7, a capacitance CA is a capacitance between the wire 50A and the iron or aluminum chassis. A capacitance CB is a capacitance between the wire 50B and the iron or aluminum chassis. A capacitance CC is a capacitance between the wire 50C and the iron or aluminum chassis. A capacitance CD is a capacitance between the wire 50D and the iron or aluminum chassis. A capacitance exists between each of the 40 other wire harnesses and the iron or aluminum chassis. However, the capacitances between the 40 other wire harnesses and the iron or aluminum chassis are not shown in FIG. 7.

A capacitance CAB is a capacitance existing between the wire 50A and the wire 50B. A capacitance CCD is a capacitance existing between the wire 50C and the wire 50D. Further, capacitances exist between the 40 other wire harnesses running in parallel with each other, but are not shown in FIG. 7. Incidentally, capacitances exist between the wire 50A and the wire 50C or the wire 50D and between the wire 50B and the wire 50C or the wire 50D. However, since the wire 50A and the wire 50B are disposed separately from the wire 50C and the wire 50D with the wire 50A and the wire 50B extending in a right direction and the wire 50C and the wire 50D extending in a left direction, the capacitances between the wires extending in the right direction and the wires extending in the left direction are small values that do not need to be considered.

Incidentally, while the above-described capacitances are equivalently represented by one capacitor in each of FIG. 6 and FIG. 7, the capacitances are actually distributed capacitances. In a case where each of the distance D1, the distance D2, and the distance D3 is fixed, a capacitance between the conductive member 1c and the iron or aluminum chassis is highest when the iron or aluminum chassis and the retaining member 1a are in contact with each other, and the retaining member 1a is sandwiched between the iron or aluminum chassis and the covering member 1b. On the other hand, the capacitance between the conductive member 1c and the iron or aluminum chassis is lowest when a space between the conductive member 1c and the iron or aluminum chassis is largest.

Thus, the magnitude of the capacitance depends not only on the distance D1, the distance D2, and the distance D3 but also on how the covering member 1b (that is, the conductive member 1c) is disposed in the retaining member 1a. In a desirable arrangement that minimizes the conductive member 1c of each wire harness and the iron or aluminum chassis, the conductive member 1c is pasted to one wall surface of the retaining member 1a, and the surface to which the conductive member 1c is pasted is disposed at as long a distance as possible from the iron or aluminum chassis. However, to employ such a structure may require management of pasting and orientations, thus resulting in poor mass productivity. As another form of arrangement, filling the space with an insulating material (dielectric material) to dispose the conductive member 1c on one side of the retaining member 1a is considered. In this case, however, the dielectric material having a high relative dielectric constant acts to increase the capacitance instead. On the other hand, the space formed inside the retaining member 1a and filled with air acts to prevent the increase in the capacitance because the relative dielectric constant of air is substantially one.

On the basis of the above viewpoints, the inventor found that there is some limitation to ranges of the distance D1, the distance D2, and the distance D3 for exerting a desirable effect of reducing leakage current. Specifically, when the distance D1 is too great as compared with the distance D1, the conductive member 1c comes in contact with the bottom surface of the retaining member 1a (a surface at a lowest position in a direction of gravity), so that the leakage current reducing effect may not be exerted. When the distance D2 is too great as compared with the distance D1, that is, the wall thickness of the retaining member 1a which thickness is represented by the distance D2 is too great, the dielectric material acts to increase the capacitance and thus increase the value of leakage current instead. Thus, the material for the retaining member 1a is desirably an insulating material with a low dielectric constant, and the material for the retaining member 1a needs to be flexible so as to be routed as a wire harness in the device while retaining a stiffness as the retaining member, that is, such a degree of stiffness as to resist crushing when the retaining member is bound by a binding band, for example. Accordingly, polyethylene is used as the retaining member.

It is necessary that a ratio between a retaining member intra-outer circumference area as the area of a cross section enclosed by an outer circumference of the retaining member 1a and a retaining member cross-sectional area as the cross-sectional area of the retaining member formed by polyethylene be within a predetermined range (within a first predetermined range). Also, it is necessary that a ratio between a retaining member space area as the area of a cross section enclosed by an inner circumference of the retaining member $1a$ and a covering member intra-outer circumference area as the area of a cross section enclosed by an outer circumference of the covering member $1b$ be within a predetermined range (within a second predetermined range). In the present embodiment, each of the retaining member intra-outer circumference area, the retaining member cross-sectional area, the retaining member space area, and the covering member intra-outer circumference area is the area of a plane having a circular shape. Therefore, the above ratios can be represented by diameter ratios. Specifically, when a ratio between the distance D1 and the distance D2 is within a predetermined range (within a first predetermined range) and a ratio between a distance as a difference between the distance D1 and the distance D2 and the distance D3 is within a predetermined range (within a second predetermined range), the capacitance between the harness and the iron or aluminum chassis is reduced, and a favorable leakage current reducing effect is obtained.

The two predetermined ranges (the first predetermined range and the second predetermined range) are values obtainable from experimental values with an amount of leakage current as a criterion for evaluation, for example. Incidentally, the action of the capacitance CABN and the capacitance CCDN between the wire harnesses shown in FIG. 6 and the capacitance CAB and the capacitance CCD between the wires shown in FIG. 7 will be described later. The magnitudes of the capacitances between the wire harnesses and the capacitances between the wires differ depending on the magnitude of the distance D4 as a distance between the conductive member $2c$ and the conductive member $3c$ in the case of the wire harness 2 shown in FIG. 5B.

FIG. 8A is a sectional view of a wire harness 31 taken along the longitudinal direction of the wire harness 31. In FIG. 8A, a conductive member $1c$ and a covering member $1b$ meander while randomly coming in contact with the inner circumference surface of a retaining member $1a$. A capacitance between the wire harness 31 and an iron or aluminum chassis in this case can be considered to be an average capacitance when the conductive member $1c$ passes through the center of the retaining member $1a$ which capacitance is increased by an amount corresponding to an increase in length of the conductive member $1c$, the increase in length of the conductive member $1c$ corresponding to the meander. That is, the wire harness 31 can be considered to achieve an effect equivalent to routing the wire such that the wire floats in a space while maintaining a certain distance from the iron or aluminum chassis, through an effect of the retaining member $1a$.

To obtain such an effect, making the length of the covering member $1b$ longer than the length of the retaining member $1a$ is considered. Then, the outside surface of the covering member $1b$ comes in contact with the inside surface of the retaining member $1a$ while meandering. As a result, a wire harness can be realized which has a small capacitance between the wire harness and an iron or aluminum chassis.

Another wire harness formed on the basis of such principles is a wire harness 32 shown in FIG. 8B. The wire harness 32 is a modification of the wire harness 2 shown in FIG. 5B. The wire harness 32 has a covering member $2b$ and a covering member $3b$ meandering in a retaining member $2a$ and a retaining member $3a$, respectively. Further, a wire harness 34 shown in FIG. 8C having four conductive members can be formed. The wire harness 34 has covering members meandering inside respective retaining members. While FIG. 8C shows the example of the wire harness 34 having the four conductive members, there is no technical limitation to the number of conductive members, and a wire harness having a larger number of conductive members can also be formed.

Other Preferred Embodiments of Liquid Crystal Display Device Using Wire Harness

Referring to FIGS. 9 to 16, description will be made of other preferred embodiments of a backlight device using the above-described wire harness. Each of FIGS. 9 to 16 shows a lighting unit, a drive and control unit, and a wire harness connecting the lighting unit and the drive and control unit to each other, and does not show other parts because the other parts are similar to those of FIG. 2.

Figure 9:
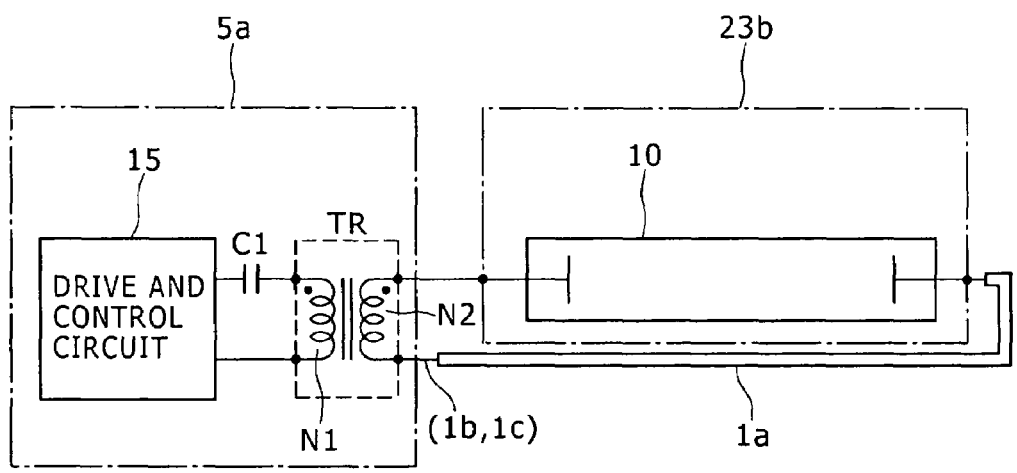
FIG. 9 is a diagram showing a connection between a drive and control unit and a lighting unit using a wire harness according to the embodiment.

FIG. 9 shows a lighting unit and a drive and control unit that produce an effect of greatly reducing leakage current when a cold cathode fluorescent tube 10 disposed in a lighting unit $23b$ is long in a longitudinal direction. Reference ($1b$, $1c$) in FIG. 9 denotes the covering member $1b$ and the conductive member $1c$ of the wire harness 1 shown in FIG. 5A, the covering member $1b$ and the conductive member $1c$ not being shown in FIG. 9. In FIG. 9, one electrode terminal of the cold cathode fluorescent tube 10 is connected to one terminal of a secondary winding of a transformer TR by a relatively short connecting line, while another electrode terminal of the cold cathode fluorescent tube 10 is connected to another terminal of the secondary winding of the transformer TR by a long wire harness 1. Since a capacitance between the conductive member $1c$ of the wire harness 1 and an iron or aluminum chassis is small, as described above, an amount of leakage current can be reduced to a small amount even when the wire harness 1 is long. Similar effects can be produced when the wire harness 31 shown in FIG. 8A is used in place of the wire harness 1.

Figure 10:
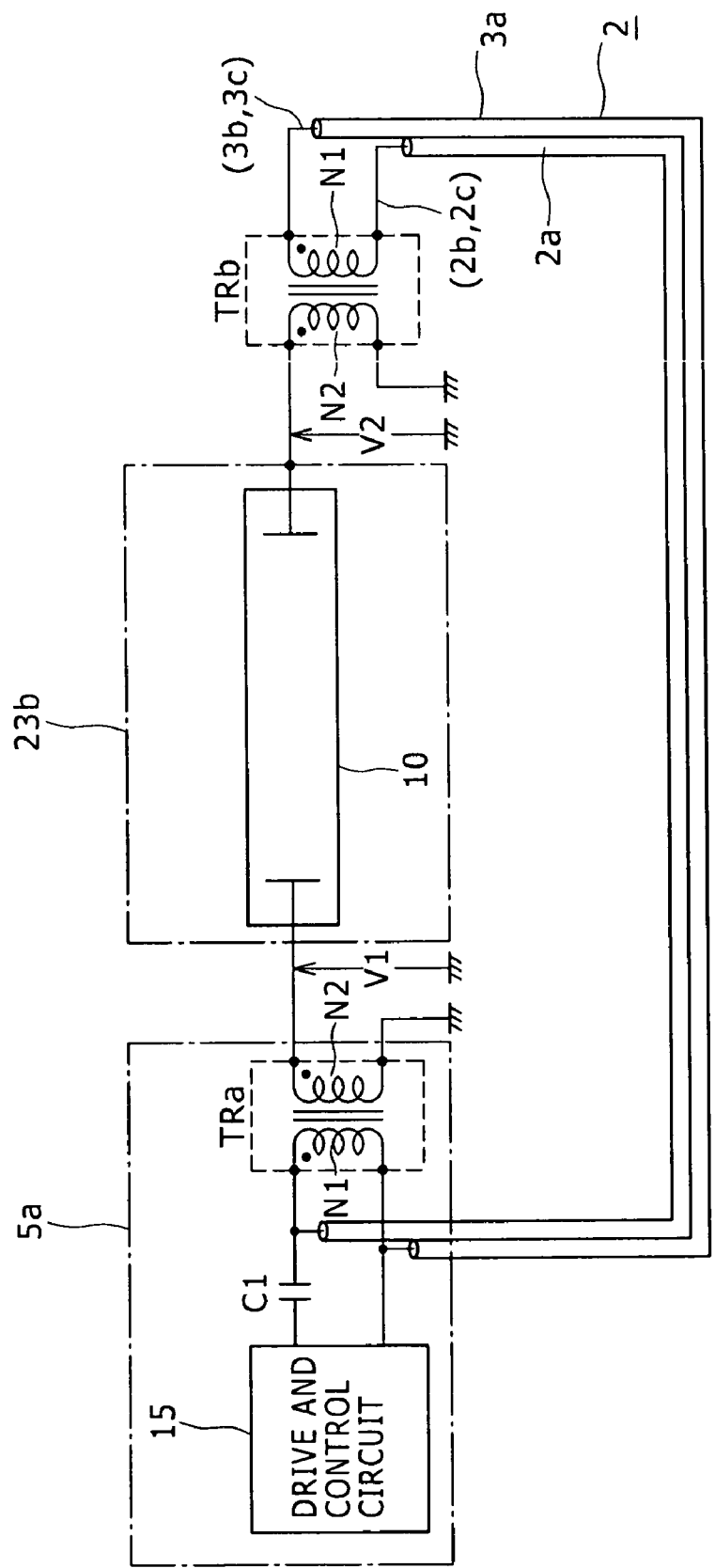
FIG. 10 is a diagram showing a connection between a drive and control unit and a lighting unit using a wire harness according to the embodiment.

FIG. 10 shows a lighting unit and a drive and control unit $5a$ that produce an effect of greatly reducing leakage current and also reduce undesired electromagnetic radiation when a cold cathode fluorescent tube 10 disposed in a lighting unit $23b$ is long in a longitudinal direction. Reference ($2b$, $2c$) and reference ($3b$, $3c$) in FIG. 10 denote the covering member $2b$ and the conductive member $2c$ and the covering member $3b$ and the conductive member $3c$ of the wire harness 2 shown in FIG. 5B, the covering member $2b$ and the conductive member $2c$ and the covering member $3b$ and the conductive member $3c$ not being shown in FIG. 10. Each of electrode terminals of the cold cathode fluorescent tube 10 which electrode terminals are disposed at both ends in the longitudinal direction is connected by a relatively short connecting line to one terminal of secondary windings N2 of a transformer TRa and a transformer TRb having an identical structure and having a leakage inductance. Another terminal of each of the secondary windings N2 of the transformer TRa and the transformer TRb is grounded. The transformer TRa and the transformer TRb act in a similar manner to that of the above-described transformer TR. The leakage inductances of the transformer TRa and the transformer TRb and a capacitor C1 form a resonant circuit. A sinusoidal-wave voltage is applied to each of the electrodes of the cold cathode fluorescent tube 10. The polarities of windings of the transformer TRa and the transformer TRb are selected such that a voltage V1 and a voltage V2 applied to the respective electrodes are of opposite polarity.

The transformer TRa and a drive and control circuit 15 are arranged in proximity to each other. The primary winding N1 of the transformer TRa is connected to the drive and control circuit 15 by a short connecting line. On the other hand, the transformer TRb is disposed near the electrode disposed at an end surface in the longitudinal direction of the cold cathode fluorescent tube. Therefore, the transformer TRb is distant from the drive and control circuit 15, and thus the primary winding N1 of the transformer TRb is connected to the drive and control circuit 15 by a long wire harness 2. Even when the transformer TRb is thus distant from the drive and control circuit 15, an amount of leakage current flowing from the wire harness 2 to an iron or aluminum chassis can be made small. Further, by setting the number of turns of the secondary winding N2 of the transformer TRb larger than the number of turns of the primary winding N1 of the transformer TRb, it is possible to lower a voltage applied to the wire harness 2 and thus further decrease the magnitude of leakage current. In the present embodiment, the transformer TRb forms a load circuit together with the cold cathode fluorescent tube.

A capacitance similar to the capacitance CABN shown in FIG. 6 is present between the conductive member 2c and the conductive member 3c of the wire harness 2 in FIG. 10. A leakage current flows via the capacitance. The magnitude of the leakage current caused by the capacitance between the lines differs depending on a difference between voltages applied to the conductive member 2c and the conductive member 3c adjacent to each other, and an amount of undesired electromagnetic radiation differs depending on the directions of currents flowing through the conductive member 2c and the conductive member 3c adjacent to each other.

Since one end of each of the conductive member 2c and the conductive member 3c is connected to the primary winding of the transformer TRb, the voltages of opposite polarity are applied to the conductive member 2c and the conductive member 3c adjacent to each other, and the currents flow through the conductive member 2c and the conductive member 3c adjacent to each other in opposite directions. As for the capacitance, since a distance between the conductive member 2c and the conductive member 3c in the wire harness 2 are equivalently made substantially constant by a retaining member 2a and a retaining member 3a, the value of the capacitance is in proportion to the length of the wire harness 2. Since the conductive member 2c and the conductive member 3c are separated from each other via a space formed by the retaining member 2a and the retaining member 3a, the magnitude of the capacitance is reduced as compared with a case where the covering member 2b and the covering member 3b are in close contact with each other.

Thus, the value of leakage current corresponding to the capacitance is smaller than when the covering member 2b and the covering member 3b are in close contact with each other. Since the directions of the currents flowing through the conductive member 2c and the conductive member 3c are opposite to each other, electromagnetic radiation can be considered to occur from a short dipole in terms of electromagnetics, and an amount of undesired electromagnetic radiation can be reduced. Incidentally, in the embodiment shown in FIG. 10, the wire harness 32 can be used in place of the wire harness 2. Incidentally, when a plurality of cold cathode fluorescent tubes 10, for example, 22 cold cathode fluorescent tubes 10, rather than one cold cathode fluorescent tube 10, are arranged in the lighting unit 23b, electrodes of the respective cold cathode fluorescent tubes can be connected in parallel with each other, so that the plurality of cold cathode fluorescent tubes can be made to emit light simultaneously.

Figure 11:
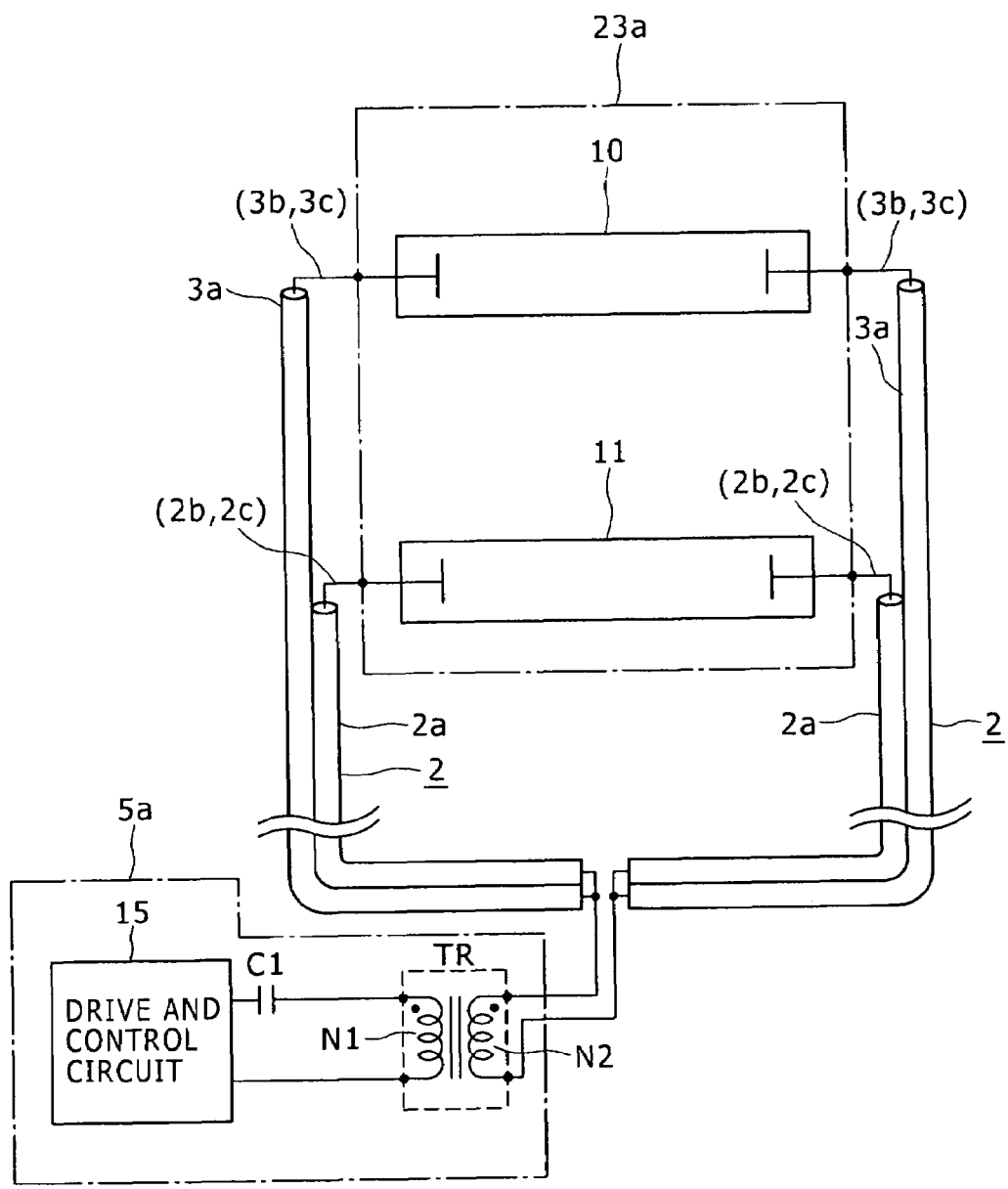
FIG. 11 is a diagram showing a connection between a drive and control unit and a lighting unit using a wire harness according to the embodiment.

FIG. 11 shows a lighting unit and a drive and control unit that produce an effect of greatly reducing leakage current when a plurality of cold cathode fluorescent tubes are disposed in a lighting unit 23b. While two cold cathode fluorescent tubes 10 and 11 are shown in FIG. 11, similar effects can be obtained in cases of three or more cold cathode fluorescent tubes by employing a similar configuration. In this case, when a permissible current capacity per conductive member forming a wire harness is set to a current capacity per cold cathode fluorescent tube, it is possible to accommodate an arbitrary number of cold cathode fluorescent tubes by forming the wire harness having a number of conductive members which number corresponds to the number of cold cathode fluorescent tubes.

In FIG. 11, one terminal of a secondary winding of a transformer TR is connected to a conductive member 2c of a wire harness 2 on a right side and a conductive member 3c of the wire harness 2 on the right side, while another terminal of the secondary winding of the transformer TR is connected to a conductive member 2c of the wire harness 2 on a left side and a conductive member 3c of the wire harness 2 on the left side. In this case, the directions of currents flowing through the conductive member 2c and the conductive member 3c of the wire harness 2 on the right side are the same, and the conductive member 2c and the conductive member 3c are at a same potential, so that no voltage occurs between the conductive member 2c and the conductive member 3c. Thus, no leakage current flows through a capacitance formed between the conductive member 2c and the conductive member 3c, and hence only a component flowing to an iron or aluminum chassis constitutes a leakage current. Similarly, the directions of currents flowing through the conductive member 2c and the conductive member 3c of the wire harness 2 on the left side are the same, and the conductive member 2c and the conductive member 3c are at a same potential, so that no leakage current flows through a capacitance formed between the conductive member 2c and the conductive member 3c of the wire harness 2 on the left side. Thus, an amount of leakage current can be made smaller.

Figure 12:
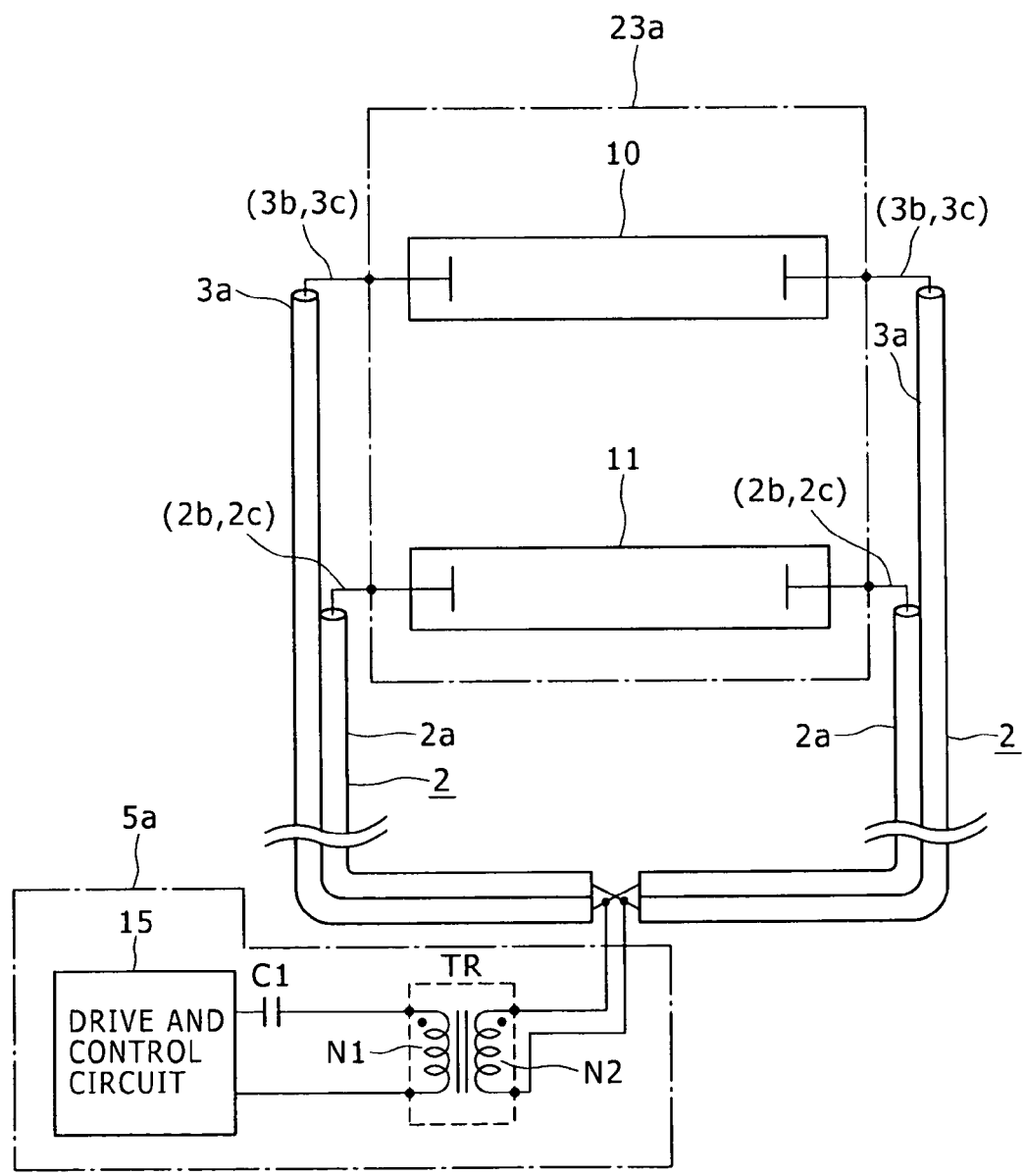
FIG. 12 is a diagram showing a connection between a drive and control unit and a lighting unit using a wire harness according to the embodiment.

In contrast to FIG. 11, FIG. 12 shows a lighting unit 23a having the same configuration as shown in FIG. 11, a drive and control unit 5a having the same configuration as shown in FIG. 6, and a wire harness 2 shown in FIG. 5B. In FIG. 12, one terminal of a secondary winding of a transformer TR is connected to a conductive member 2c of a wire harness 2 on a right side and a conductive member 3c of the wire harness 2 on a left side, while another terminal of the secondary winding of the transformer TR is connected to a conductive member 3c of the wire harness 2 on the right side and a conductive member 2c of the wire harness 2 on the left side. Thus, the directions of currents flowing through conductive members adjacent to each other can be made opposite to each other as in FIG. 10. In this case, an amount of undesired radiation can be reduced, as described above. Incidentally, in each of FIG. 11 and FIG. 12, the above-described wire harness 32 can be used in place of the wire harness 2.

In each of the above-described backlight devices shown in FIG. 6 and FIGS. 9 to 12, the drive and control unit functioning as a driving power supply unit for generating alternating-current power and the lighting unit functioning as a load circuit supplied with the alternating-current power are connected to each other by the wire harness having the conductive member and the retaining member shown in FIG. 5A or 5B, and such a wire harness suppresses leakage current from the conductive member. In a case where a large number of cold cathode fluorescent tubes are used in the lighting unit, currents flowing through the respective cold cathode fluorescent tubes may be nonuniform in magnitude when the cold cathode fluorescent tubes are simply connected in parallel with each other as described above. This is because the lengths of paths from the drive and control unit to the respective cold cathode fluorescent tubes differ from each other and thus the magnitudes of leakage currents from the conductive members connecting the drive and control unit to the respective cold cathode fluorescent tubes differ from each other, and also because the characteristics themselves of the cold cathode fluorescent tubes are varied. FIGS. 13 to 15 show configurations of drive and control units that can prevent the magnitudes of currents flowing through such cold cathode fluorescent tubes from differing from each other and can feed uniform currents to the respective cold cathode fluorescent tubes. FIG. 16 shows a backlight device using such a drive and control unit.

A drive and control unit 5b shown in FIG. 13 uses a balance coil Lb to uniformize a current In1 flowing through a cold cathode fluorescent tube 10 and a current In2 flowing through a cold cathode fluorescent tube 11. The balance coil Lb is referred to also as a common mode choke coil. When the number of turns of a winding NLb1 is equal to the number of turns of a winding NLb2, a current flowing in from a terminal Lbi is divided into the current In1 flowing from a terminal Lbo1 and the current In2 flowing from a terminal Lbo2. The balance coil Lb acts to equalize the magnitude of the current In1 with the magnitude of the current In2. Specifically, the current In1 is extracted from a winding end terminal of the winding NLb1, and the current In2 is extracted from a winding start terminal of the winding NLb2. Since the winding NLb1 and the winding NLb2 are magnetically closely coupled to each other, an electromotive force occurs in each winding according to a difference between the current In1 and the current In2, and a feedback effect equalizes the current In1 with the current In2. Incidentally, a contact C1b1 and a contact C1a1, a contact C1b2 and a contact C1a2, and a contact C2b and a contact C2a are contacts of connectors, and are used to make the drive and control unit 5b detachable from a lighting unit 23a.

A drive and control unit 5c shown in FIG. 14 uses a set of a plurality of balance coils as a balance coil Lb to divide a current flowing in from a terminal Lbi into a current In1 flowing from a terminal Lbo1, a current In2 flowing from a terminal Lbo2, a current In3 flowing from a terminal Lbo3, and a current In4 flowing from a terminal Lbo4. When the number of turns of a winding NLb1 is equal to the number of turns of a winding NLb2, the number of turns of a winding NLb3 is equal to the number of turns of a winding NLb4, and the number of turns of a winding NLb5 is equal to the number of turns of a winding NLb6, the magnitude of the current In1 for a cold cathode fluorescent tube 10, the magnitude of the current In2 for a cold cathode fluorescent tube 11, the magnitude of the current In3 for a cold cathode fluorescent tube 12, and the magnitude of the current In4 for a cold cathode fluorescent tube 13 are all equal to each other. Incidentally, a contact C1b1 and a contact C1a1, a contact C1b2 and a contact C1a2, a contact C1b3 and a contact C1a3, a contact C1b4 and a contact C1a4, and a contact C2b and a contact C2a are contacts of connectors, and are used to make the drive and control unit 5c detachable from a lighting unit 23a.

FIG. 15 shows a backlight device of the liquid crystal display device shown in FIGS. 1A and 1B and FIG. 2. One terminal of a secondary winding N2 of a transformer TR in a drive and control unit 5a is connected to a conductive member of a wire harness 1f via a connector CNA. The conductive member of the wire harness 1f is connected to a balance coil unit 64a via a connector CNC. Another terminal of the secondary winding N2 of the transformer TR is connected to a conductive member of a wire harness 1g via a connector CNB. The conductive member of the wire harness 1g is connected to a balance coil unit 64b via a connector CND. The balance coil unit 64a and the lighting unit 23a are connected to each other via connectors CN1a to CN22a. The balance coil unit 64b and the lighting unit 23a are connected to each other via connectors CN1b to CN22b. In this case, a voltage generated across the secondary winding N2 of the transformer TR is 700 V (volts), and the length of the wire harness 1g, which is the longer wire harness, is 750 mm (millimeters). Since such a high voltage is applied to the long wire harness, the magnitude of leakage current becomes higher when a wire harness in the past is used in place of the wire harness 1g.

The backlight device shown in FIG. 15 uses two balance coil units, that is, the balance coil unit 64a and the balance coil unit 64b. However, as shown in FIG. 14, a balance unit may be used on only one electrode side, and electrodes on another electrode side may be connected directly to each other without a balance unit being used. However, providing a balance coil on both electrode sides as shown in FIG. 15 can improve uniformity of currents flowing through respective cold cathode fluorescent tubes.

In addition, as shown in FIG. 10, two transformers, that is, a transformer TRa and a transformer TRb may be provided with a secondary winding N2 of the transformer TRa connected to the balance coil unit 64a and a secondary winding N2 of the transformer TRb connected to the balance coil unit 64b. In this case, the transformer TRb is made to have the same structure as the transformer TRa, and the number of turns of each of the secondary windings N2 disposed in the transformer TRa and the transformer TRb is made larger than the number of turns of each of the primary windings N1 disposed in the transformer TRa and the transformer TRb, so that the value of a voltage applied to the wire harness 1g as the longer wire harness is lowered. It is thereby possible to further suppress leakage current. For example, when the number of turns of the primary winding N1 is one and the number of turns of the secondary winding N2 is four, the voltage applied to the wire harness 1g can be reduced to ¼ of a voltage in a case of the transformer TRb not being provided. Thereby leakage current can be suppressed. However, since two transformers are used, the configuration for suppressing leakage current using the wire harness 1g in the present embodiment is advantageous from a viewpoint of reducing device size.

Balance coils Lb1a to Lb21a are arranged in the balance coil unit 64a and balance coils Lb1b to Lb21b are arranged in the balance coil unit 64b to equalize currents flowing through the respective cold cathode fluorescent tubes arranged in the lighting unit 23a. In each of the balance coils other than the balance coil Lb20a and the balance coil Lb20b, the numbers of turns of two windings forming the balance coil are equal to each other. In the balance coil Lb20a and the balance coil Lb20b, two cold cathode fluorescent tubes are connected to one winding, and eight cold cathode fluorescent tubes are connected to another winding. Thus, supposing that the number of turns of the winding to which the eight cold cathode fluorescent tubes are connected is one, the number of turns of the winding to which the two cold cathode fluorescent tubes are connected is four.

FIG. 16 shows an arrangement on a chassis 63 of a drive and control unit 5a, a balance coil unit 64a, a balance coil unit 64b, a wire harness 1f, a wire harness 1g, and cold cathode fluorescent tubes (FIG. 16 shows only a cold cathode fluorescent tube 10 and a cold cathode fluorescent tube 11 among 22 cold cathode fluorescent tubes, and does not show the 20 other cold cathode fluorescent tubes that are arranged in parallel with each other). The wire harness 1f and the wire harness 1g in this case have the same structure as the wire harness 1 shown in FIG. 5A. In the arrangement shown in FIG. 16, the wire harness 1f and the wire harness 1g are used to reduce current leaking to the chassis 63 formed by iron or aluminum having conductivity, and the balance coil unit 64a and the balance coil unit 64b are used to uniformize currents flowing through the respective cold cathode fluorescent tubes and thereby uniformize the brightness of light emitted from the respective cold cathode fluorescent tubes.

Though not shown in the diagram of FIG. 16 showing the arrangement of constituent parts of a liquid crystal display device, a signal processing board and a panel driving circuit board included in a panel driving unit 21 (see FIG. 2) are arranged. The panel driving unit 21, as a whole, occupies a large board area, and the panel driving unit 21 handles higher frequencies than the drive and control unit 5a. Therefore, priority is given to the arrangement position of the panel driving unit 21. It becomes difficult to dispose the drive and control unit 5a near the electrodes of the cold cathode fluorescent tubes. Inevitably, the wire harness 1f and the wire harness 1g tend to have nonuniform lengths, and both or one of the wire harness 1f and the wire harness 1g tend to be increased in length. Considering such a situation of the liquid crystal display device, a leakage current reducing effect produced by using the wire harness 1f and the wire harness 1g having the same structure as the wire harness 1 shown in FIG. 5A is significant.

Figure 17:
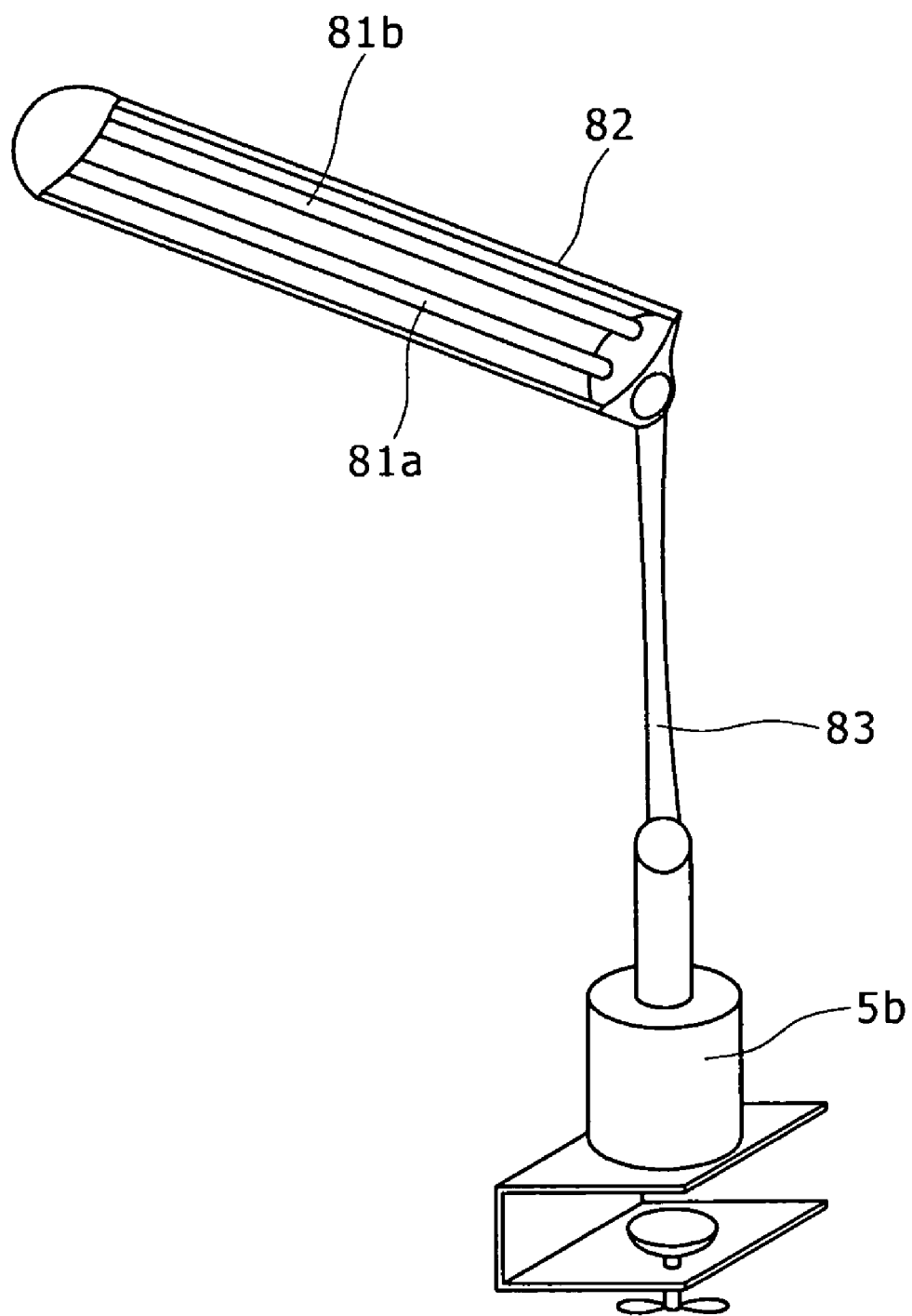
FIG. 17 is a diagram showing a lighting device according to an embodiment.

FIG. 17 illustrates an example of application of the wire harness 1 shown in FIG. 5A and the wire harness 2 shown in FIG. 5B to a lighting device. All the embodiments related to the above-described backlight devices are applicable to such a lighting device. A circuit part of the lighting device is similar to that shown in FIG. 13. In the lighting device shown in FIG. 17, only two cold cathode fluorescent tubes are provided as a cold cathode fluorescent tube 81a and a cold cathode fluorescent tube 81b in place of the cold cathode fluorescent tube 10 and the cold cathode fluorescent tube 11 in the lighting unit 23a in FIG. 13. The wire harness 2 (not shown in FIG. 17) connects a terminal Lbo1 of a drive and control unit 5b to one electrode (not shown in FIG. 17) of the cold cathode fluorescent tube 81a via a contact C1b1 and a contact C1a1, and also connects a terminal Lbo2 of the drive and control unit 5b to one electrode (not shown in FIG. 17) of the cold cathode fluorescent tube 81b via a contact C1b2 and a contact C1a2. The wire harness 1 (not shown in FIG. 17) connects a secondary winding N2 of a transformer TR in the drive and control unit 5b to another electrode (not shown in FIG. 17) of the cold cathode fluorescent tube 81a and another electrode (not shown in FIG. 17) of the cold cathode fluorescent tube 81b via a contact C2b and a contact C2a. A supporting member 83 and a hood 82 are formed by a conductive metallic material having a hollow part. Wiring is performed by passing the wire harness 1 and the wire harness 2 through hollow parts of the supporting member 83 and the hood 82.

With such a structure, a drive and control unit 5b functioning as a driving power supply unit for supplying alternating-current power, which unit is a large structural part attached to a base of the lighting device, is separated at a long distance from the cold cathode fluorescent tubes attached to an upper part of the lighting device and supplied with the alternating-current power. In addition, since the hood 82 as a casing retaining the cold cathode fluorescent tubes and the supporting member 83 retaining the wire harness 1 and the wire harness 2 are both formed of a metallic material, capacitances between the wire harness 1 and the wire harness 2 and these metallic materials are large. However, it is possible to reduce leakage current from the wire harness 1 and the wire harness 2, which have a conductive member enclosed by a retaining member formed of an insulating material with a space. Also, a balance coil Lb disposed in the drive and control unit 5b can feed uniform currents to the cold cathode fluorescent tube 81a and the cold cathode fluorescent tube 81b.

It should be understood by those skilled in the art that various modifications, combinations, sub-combinations and alterations may occur depending on design requirements and other factors insofar as they are within the scope of the appended claims or the equivalents thereof.

The invention claimed is:

1. A wire harness, comprising:
    a conductive member configured to connect electric members to each other for electric conduction;
    a covering member configured to enclose and cover the conductive member, the covering member being formed of a first insulating material; and
    a retaining member configured to enclose the covering member so as to define a space between the covering member and the retaining member, the retaining member being formed of a second insulating material,
    in which the covering member meanders inside the space such that the covering member contacts different sides of an inside surface of the retaining member along a longitudinal direction of the wire harness.

2. The wire harness as claimed in claim 1, wherein a ratio between a retaining member intra-outer circumference area as an area of a cross section enclosed by an outer circumference of the retaining member and a retaining member cross-sectional area as a cross-sectional area of the second insulating material is within a first predetermined range, and a ratio between a retaining member space area as an area of a cross section enclosed by an inner circumference of the retaining member and a covering member intra-outer circumference area as an area of a cross section enclosed by an outer circumference of the covering member is within a second predetermined range.

3. The wire harness as claimed in claim 1, wherein the retaining member has a first retaining member and a second retaining member arranged in substantially close contact with each other and substantially parallel to each other.

4. The wire harness as claimed in claim 1, wherein one of the electric members connected to each other by the conductive member is connected to a driving power supply unit configured to supply alternating-current power;
    the other electric member is connected to a load circuit supplied with the alternating-current power; and
    the retaining member suppresses leakage of the alternating-current power.

* * * * *